US006208713B1

(12) United States Patent
Rahrer et al.

(10) Patent No.: US 6,208,713 B1
(45) Date of Patent: *Mar. 27, 2001

(54) METHOD AND APPARATUS FOR LOCATING A DESIRED RECORD IN A PLURALITY OF RECORDS IN AN INPUT RECOGNIZING TELEPHONE DIRECTORY

(75) Inventors: Timothy Joseph Rahrer, Ottawa; Brian Finlay Beaton, Gloucester; Colin Donald Smith, Ottawa, all of (CA)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/760,966

(22) Filed: Dec. 5, 1996

(51) Int. Cl.$^7$ .................................................. H04M 1/64
(52) U.S. Cl. ............................ 379/67.1; 379/83; 379/85; 379/88.01; 379/88.02; 379/88.07; 379/88.09
(58) Field of Search .................................. 379/67, 91.01, 379/93.02, 93.03, 100.03, 88, 89, 133, 139, 67.1, 88.01, 88.02, 88.07, 88.08, 83, 85, 88.09, 111, 113

(56) References Cited

U.S. PATENT DOCUMENTS

| 3,602,895 | * | 8/1971 | Loizides | 707/1 |
| 3,742,143 | | 6/1973 | Awipi | 179/1 SA |
| 4,313,035 | | 1/1982 | Jordan et al. | 179/18 |
| 4,348,550 | | 9/1982 | Pirz et al. | 179/1 SD |
| 4,593,157 | | 6/1986 | Usdan | 179/90 BD |
| 4,731,811 | | 3/1988 | Dubus | 379/58 |

(List continued on next page.)

FOREIGN PATENT DOCUMENTS

| 3837385 A1 | 5/1989 | (DE) . | |
| 0 269 364 A2 | 6/1988 | (EP) . | |
| 0 431 890 A2 | 6/1991 | (EP) | G10L/5/06 |
| 0 477 854 A2 | 4/1992 | (EP) | H04M/1/274 |
| 0 709 996 A2 | 5/1996 | (EP) | H04M/3/44 |

(List continued on next page.)

OTHER PUBLICATIONS

Patent Abstracts of Japan from the European Patent Office. Publication No. 06121014. Publication date: Apr. 28, 1994. Application No. 04267298, application date Oct. 6, 1992. Applicant: Kyocera Corp. Title: Communication Terminal Equipment. Int. Cl.: H04M 1/274.

(List continued on next page.)

*Primary Examiner*—Krista Zele
*Assistant Examiner*—Allan Hoosain

(57) ABSTRACT

A method and apparatus for locating a desired record amongst a plurality of records in a telephone directory involves associating a frequency field with each of the records, the frequency field being operable to store a frequency metric. A characteristic field is also associated with each of the records, the characteristic field being operable to store a characteristic representation of at least one identifying characteristic of a rendering associated with the record. An input representation of a rendering purporting to identify the desired record is produced and the input representation is compared with the contents of the characteristic fields of at least some of the records and confidence metrics are assigned to the records respectively, each of the confidence metrics representing a respective probability that a respective record is the desired record. A determination is then made as to which of the records have the first and second highest confidence metrics. The frequency fields of the records having the first and second highest confidence metrics are then read and the record with the highest frequency metric is identified as the desired record. Instruction codes stored on a computer-readable memory medium may be used to configure a general purpose computer to effect the method.

49 Claims, 12 Drawing Sheets

U.S. PATENT DOCUMENTS

| | | | |
|---|---|---|---|
| 4,737,976 | 4/1988 | Borth et al. | 379/58 |
| 4,791,666 * | 12/1988 | Cobb et al. | 379/213 |
| 4,827,500 | 5/1989 | Binkerd et al. | 379/88 |
| 4,829,576 | 5/1989 | Porter | 381/43 |
| 4,853,953 | 8/1989 | Fujisaki | 379/88 |
| 4,864,622 | 9/1989 | Iida et al. | 381/41 |
| 4,868,570 * | 9/1989 | Davis | 341/106 |
| 4,928,302 | 5/1990 | Kaneuchi et al. | 379/88 |
| 4,945,557 | 7/1990 | Kaneuchi et al. | 379/67 |
| 4,959,850 | 9/1990 | Marui | 379/58 |
| 4,959,855 | 9/1990 | Daudelin | 379/213 |
| 4,961,212 | 10/1990 | Marui et al. | 379/67 |
| 4,979,206 | 12/1990 | Padden et al. | 379/67 |
| 5,007,081 * | 4/1991 | Schmuckal et al. | 379/354 |
| 5,018,201 | 5/1991 | Sugawara | 381/43 |
| 5,042,063 | 8/1991 | Sakanishi et al. | 379/88 |
| 5,054,053 | 10/1991 | Sakanishi et al. | 379/63 |
| 5,111,501 | 5/1992 | Shimanuki | 379/355 |
| 5,155,763 | 10/1992 | Bigus et al. | 379/113 |
| 5,163,081 | 11/1992 | Wycherley et al. | 379/52 |
| 5,165,095 | 11/1992 | Borcherding | 379/88 |
| 5,168,548 | 12/1992 | Kaufman et al. | 395/2 |
| 5,181,237 | 1/1993 | Dowden et al. | 379/88 |
| 5,182,765 | 1/1993 | Ishii et al. | 379/88 |
| 5,185,781 | 2/1993 | Dowden et al. | 379/67 |
| 5,187,735 | 2/1993 | Garcia et al. | 379/88 |
| 5,204,894 | 4/1993 | Darden | 379/88 |
| 5,222,121 | 6/1993 | Shimada | 379/88 |
| 5,267,308 | 11/1993 | Jokinen et al. | 379/354 |
| 5,301,227 | 4/1994 | Kamei et al. | 379/88 |
| 5,315,649 | 5/1994 | Foster et al. | 379/355 |
| 5,325,421 * | 6/1994 | Hou et al. | 379/67 |
| 5,333,184 * | 7/1994 | Doherty et al. | 379/115 |
| 5,335,261 | 8/1994 | Fujinaka | 379/58 |
| 5,353,330 | 10/1994 | Fujiwara | 379/58 |
| 5,353,336 | 10/1994 | Hou et al. | 379/67 |
| 5,357,596 | 10/1994 | Takebayashi et al. | 395/2.84 |
| 5,369,685 | 11/1994 | Kero | 379/67 |
| 5,371,779 | 12/1994 | Kobayashi | 379/58 |
| 5,392,342 | 2/1995 | Rosenthal | 379/211 |
| 5,398,279 | 3/1995 | Frain | 379/140 |
| 5,430,791 | 7/1995 | Feit et al. | 379/67 |
| 5,452,340 | 9/1995 | Engelbeck et al. | 379/67 |
| 5,452,397 | 9/1995 | Ittycheriah et al. | 395/2.49 |
| 5,465,401 | 11/1995 | Thompson | 455/89 |
| 5,467,383 | 11/1995 | Urasaka et al. | 379/61 |
| 5,479,488 | 12/1995 | Lennig et al. | 379/67 |
| 5,479,489 | 12/1995 | O'Brien | 379/67 |
| 5,483,579 | 1/1996 | Stogel | 379/88 |
| 5,488,652 | 1/1996 | Bielby et al. | 379/88 |
| 5,509,058 * | 4/1996 | Sestak et al. | 379/201 |
| 5,524,145 | 6/1996 | Parker | 379/197 |
| 5,553,125 | 9/1996 | Martensson | 379/140 |
| 5,568,546 | 10/1996 | Marutiak | 379/355 |
| 5,581,611 | 12/1996 | Yunoki | 379/211 |
| 5,583,564 | 12/1996 | Rao et al. | 348/14 |
| 5,592,538 * | 1/1997 | Kosowsky et al. | 379/93 |
| 5,592,546 | 1/1997 | Takahashi | 379/355 |
| 5,638,425 * | 6/1997 | Meador, III et al. | 379/88 |
| 5,642,411 | 6/1997 | Theis | 379/266 |
| 5,706,339 | 1/1998 | Eisdorfer et al. | 379/211 |
| 5,712,957 | 1/1998 | Waibel et al. | 395/2.49 |
| 5,717,738 | 2/1998 | Gammel | 379/67 |
| 5,724,411 | 3/1998 | Eisdorfer et al. | 379/93.23 |
| 5,742,674 | 4/1998 | Jain et al. | 379/209 |
| 5,905,789 | 5/1999 | Will | 379/211 |
| 5,912,949 | 6/1999 | Chan et al. | 379/88.03 |
| 5,917,891 * | 6/1999 | Will | 379/88.03 |

FOREIGN PATENT DOCUMENTS

| | | |
|---|---|---|
| 2 292 043 | 2/1996 | (GB). |
| 2315191 | 1/1998 | (GB). |
| 06014098 | 1/1994 | (JP). |
| WO 87/07460 | 12/1987 | (WO). |
| WO 96/38971 | 12/1996 | (WO). |
| WO 97/19546 | 5/1997 | (WO). |
| WO 97/37499 | 10/1997 | (WO). |

OTHER PUBLICATIONS

Patent Abstracts of Japan from the European Patent Office. Publication No. 07095279. Publication date: Apr. 7, 1995. Application No. 05233106, application date Sep. 20, 1993. Applicant: Fuijitsu Ltd. Title: Memory Dialing Control System. Int. Cl.: H04M 1/56 H04M 1/274.

Patent Abstracts of Japan from the European Patent Office. Publication No. 07336426. Publication date Dec. 22, 1995. Application No. 06126335, application date Jun. 8, 1994. Applicant: Tottori Sanyo Electric Co Ltd. Title Communication Equipment. Int. Cl.: H04M 1/274 H04Q 7/38.

VCS Company Page—website http://www.voicecontrol.com/applicationstxt.html1#PVDIALER (as of Jul. 29, 1997).

Southerwestern Bell (tm)—website htto://www.swbell.com/Home.html (as of Jul. 28, 1997).

VCS 2030/2060 Voice Dialer User Manual, Voice Control Systems Inc. Version C., Aug. 1995.

Southwestern Bell's Voice Dial Service, Southwestern Bell on–line WWW page, http://www.sbc.com/swbell/shortsub/voice_dial.html, Mar. 1996.

Bell Atlantic NYNEX Mobile Debuts Unique Voice Dialing Service, Talkdial, Bell Atlantic on–line WWW page, http://ba.com/nr/96/feb/2–15talkdial.html, Feb. 15, 1996.

PCT International Publication No. WO 94/14270, published Jun. 23, 1994. PCT Application No. PCT/US/93/12247, filed Dec. 16, 1993. Title: Mechanized Directory Assistance. Applicant: Bell Atlantic Network Services, Inc.

Patent Abstracts of Japan from the European Patent Office. Publication No. 07320001. Publication date Dec. 8, 1995. Application No. 06109478, application date May 24, 1994. Applicant: Toshiba Comput Eng Corp. Title: Character Recognition Device and Method for Referring to Recognition Dictionary. Int. Cl.: G06K 9/68 and G06K 9/03.

Patent Abstracts of Japan from the European Patent Office. Publication No. 07282203. Publication date: Oct. 27, 1995. Application No. 06069635, application date Apr. 7, 1994. Applicant: Hitachi Ltd. Title: Character Input Device. Int. Cl.: G06K 9/68 and G06F 17/22 and G06K 9/62.

Patent Abstracts of Japan from the European Patent Office. Publication No. 07283858. Publication date: Oct. 27, 1995. Application No. 06068247, application date Apr. 6, 1994. Applicant: Nippon Telegr & Teleph Corp. Title: Talking Opposite Party Automatic Registration Type Voice Dialer. Int. Cl.: H04M 1/274 H04M 1/27.

Rumelhart, David E. et al., Parallel Distributed Processing; Explorations in the Microstructure of Cognition, Chapter 8: "Learning Internal Representations by Error Propagation", vol. 1: Foundations, 1986, pp. 318–362.

Rosenberg, A.E. and Schmidt, C.E., The Bell System Technical Journal, "Automatic Recognition of Spoken Spelled Names for Obtaining Directory Listings," Oct. 1979, pp. 1797–1823.

Rabiner, L.R., et al., The Bell System Technical Journal, "A Voice–Controlled Repertory–Dialer System," Sep. 1980, pp. 1153–1163.

* cited by examiner

METHOD AND APPARATUS FOR LOCATING A DESIRED RECORD IN A PLURALITY OF RECORDS IN AN INPUT RECOGNIZING TELEPHONE DIRECTORY

BACKGROUND OF THE INVENTION

This invention relates to devices for maintaining a telephone directory of names and telephone numbers which a user frequently calls. More particularly, the invention relates to locating a desired record from among a plurality of records in an input recognizing telephone directory. Input which may be recognized by such a directory includes voice input and handwritten input.

Telephones equipped with electronic personal telephone directories for storing the name, number and other reference information of frequently called contacts have become commonplace in both mobile cellular applications and in wired residential and business applications. Typically, speech recognition, soft keys, or touch screen interfaces are used to dial a phone number selected from a list stored electronically in a personal directory. In existing systems, the user must create and administer their personal directory manually. This is accomplished by manually keying in a telephone number of a new entry. The user may also be required or provided the option to key in the text of the name corresponding to the number entered and other personal information such as location (home, office, cell, etc.)

Some systems have the added feature of being speech recognition driven. In such systems, the user simply states the name of the party to be called, and the system performs speech recognition to correlate the spoken name with a speech template stored in association with the directory number of the party to be called. These systems are typically user-trained. The user must train the speech recognizer with two or three examples of an utterance to be associated with each directory number entered. With personal directories supporting on the order of 50 entries or more, the creation of a personal directory can be time consuming and tedious.

SUMMARY OF THE INVENTION

In accordance with one aspect of the invention there is provided a method of locating a desired record amongst a plurality of records in a telephone directory. The method involves associating a frequency field with each of the records, the frequency field being operable to store a frequency metric. A characteristic field is also associated with each of the records, the characteristic field being operable to store a characteristic representation of at least one identifying characteristic of a rendering associated with the record. An input representation of a rendering purporting to identify the desired record is produced and the input representation is compared with the contents of the characteristic fields of at least some of the records and confidence metrics are assigned to the records respectively, each of the confidence metrics representing a respective probability that a respective record is the desired record. A determination is then made as to which of the records have the first and second highest confidence metrics. The frequency fields of the records having the first and second highest confidence metrics are then read and the record with the highest frequency metric is identified as the desired record.

Preferably, the contents of the frequency field of the desired record are increased when the desired record is located.

Preferably, a determination is made as to whether or not at least one of the first and second confidence metrics has a value greater than a first pre-defined value, a difference between the first and second confidence metrics is determined and a determination is made as to whether the difference is greater than a second pre-defined value.

Preferably, where the difference is greater than the second pre-defined value, the desired record is selected as the record having the first highest confidence metric.

A determination may be made to determine whether the contents of the frequency field of the record having the first highest frequency metric are greater than a third pre-defined value and where the contents of the frequency field, of the record having the highest frequency metric, are greater than the third pre-defined value, the record having the highest frequency metric is selected as the desired record. Preferably, where the first highest frequency metric is less than the third pre-defined value, the user is prompted to repeat the rendering.

Preferably, the act of producing an input representation of a rendering includes digitizing an utterance made by the user. Preferably, an oral utterance from the user is digitized to produce the input representation.

Preferably, when the highest confidence metric is not greater than a fourth pre-defined value or the difference between the confidence metrics is not greater than a fifth pre-defined value, and when the difference in confidence metrics is less than the fifth pre-defined value, and when the second highest confidence metric is less than the fourth pre-defined value, a determination is made as to which of the first and second records has the first highest frequency metric and the user is prompted to confirm that the record having the first highest frequency metric is the desired record. Where the user confirms that the record having the first highest frequency metric is the desired record, the record which has the first highest frequency metric is selected and the contents of the frequency field of the desired record are incremented. Where the user denies that the record having the first highest frequency metric is the desired record, the user is prompted to confirm that the record having the second highest frequency metric is the desired record. Where the user confirms that the record having second highest frequency metric is the desired record, the record which has the second highest frequency metric is selected and the contents of the frequency field of the desired record are incremented.

Preferably, where the user denies that the record having second highest frequency metric is the desired record, the user is prompted to repeat the rendering.

A determination may be made to determine which of the records having the first and second highest confidence metrics has the highest value in its frequency field, a Figure of Merit is determined based on a weighted sum of the confidence metric associated with the record having the frequency field with the greatest value, the difference between the first and second confidence metrics, and the contents of the frequency field of the record having the highest frequency field contents and a determination is made as to whether the Figure of Merit is greater than a sixth pre-defined value and if so, the record having the frequency field with the greatest value is selected as the desired record.

The frequency field may store a frequency of use metric related to the number of times the record is used or the frequency field may store a frequency of success metric related to the number of times the related record is selected as the desired record.

Optionally, the frequency field includes a frequency of use field operable to store a frequency of use metric related to the number of times the record is used and a frequency of success field operable to store a frequency of success metric related to the number of times the record is selected as the desired record.

In accordance with another aspect of the invention, there is provided an apparatus for carrying out the above method.

In accordance with another aspect of the invention there is provided a computer-readable storage medium operable to store codes operable to direct a computer to perform the steps of the method according to the first aspect of the invention.

The above method and apparatus provides some intelligence to a personal telephone directory by selecting a desired record from a plurality of records on the basis of frequency of use of a particular record or frequency of success in associating a utterance issued by the user with a desired record, or both. Use of this additional information, in conjunction with confidence metrics, improves the accuracy of selecting the desired record from the plurality of records. Use of frequency of success or frequency of use information separately or together allows the system to select the desired record with the assistance of the user's calling habits. This reduces the number of times the user is required to repeat the utterance.

BRIEF DESCRIPTION OF THE DRAWINGS

In drawings which illustrate embodiments of the invention.

DETAILED DESCRIPTION

Figure 1:
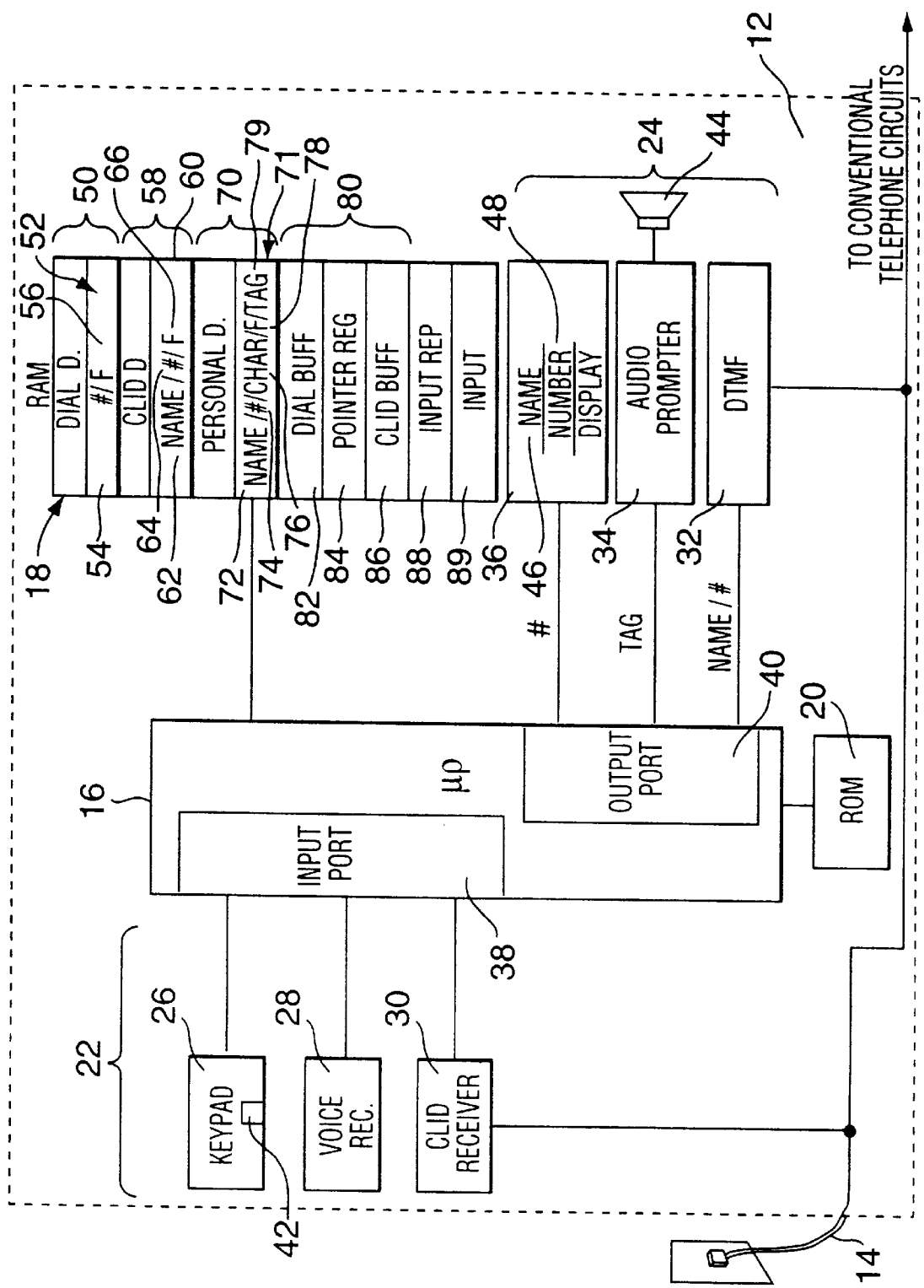
FIG. 1 is a block diagram of an apparatus according to a first embodiment of the invention.

Referring to FIG. 1, an apparatus according to a first embodiment of the invention is shown generally at 10. In this embodiment, the apparatus is included within a telephone 12 connected to a central office (not shown) via a conventional subscriber loop 14. The central office is of the type capable of supplying Calling Line Identification (CLID) information to the telephone when a call is made to the telephone. The central office acts as a first network location.

The apparatus includes a microprocessor 16, random access memory 18, read only memory 20, and input and output devices shown generally at 22 and 24 respectively. The input devices 22 include a keypad 26, a voice recognition unit 28 (including a microphone and speech digitizer, not shown) and a CLID receiver 30. The output devices include a dual tone multi-frequency (DTMF) generator 32, an audio prompter 34 and a liquid crystal display (LCD) unit 36.

Microprocessor

In this embodiment, the microprocessor is a Mitsubishi 37510. This microprocessor has an address bus, a data bus and control signal lines for interfacing to other elements of the apparatus. The microprocessor further has an input port 38 and an output port 40 which are operable to selectively address any of the input and output devices respectively.

Keypad

The keypad 26 includes a conventional telephone keypad operable to cooperate with the microprocessor 16 to produce keypad bytes indicative of a key depression on the keypad, and further includes an add key 42 which the user may actuate to direct the microprocessor 16 to effect certain functions associated therewith.

Voice Recognition Unit

The voice recognition unit 28 cooperates with the microprocessor to produce a number which uniquely identifies an utterance made by the user, and a voice tag, or digitized sound clip of the user's voice. The number acts as a characteristic representation of at least one identifying characteristic of a rendering associated with the record. In this embodiment the rendering is a voice utterance made by the user. The characteristic representation is used for comparison with further utterances to "recognize" what the user is saying. The voice tag is used by the audio prompter to "playback" the name of a party.

The voice recognition unit 28 also recognizes standard commands such as "YES" or "NO" and responds to such commands by providing to the microprocessor command data packets indicative of the command received. Thus all matching of user-spoken utterances to commands takes place at the voice recognition unit 28.

CLID Receiver

The CLID receiver 30 receives CLID information from the telephone line 14 and produces name and number packets corresponding to the name and telephone number of an incoming caller. The CLID receiver 30 may be equipped to receive the CLID information in any one of many different ways. For example, CLID information may be received over a phone line using a CLASS (Custom Local Area Signalling Services) service offered by a telephone service provider. Alternatively, the CLID receiver 30 may include a voice mail service equipped to automatically store incoming CLID information. CLID information could also be received over a cellular network through an SMS (Short Messaging Services) service, for example. In this embodiment, the CLID receiver acts as a caller information receiver and a detector for detecting when a telephone call is received from a calling party.

DTMF Generator

The DTMF generator 32 is a conventional dialler and is operable to produce dual-tone multi-frequency signals which are supplied to the telephone line 14 to permit the apparatus to dial a telephone number in response to a number packet produced by the microprocessor 16. In this embodiment the microprocessor also acts as a detector for detecting when a call is made to a called party.

Audio Prompter

The audio prompter 34 includes a speaker 44 and is operable to playback the name of a party as digitized by the voice recognition unit.

Display

In this embodiment, the display 36 includes a conventional liquid crystal display (LCD) having two horizontal lines of text 46 and 48, each capable of displaying 20 characters. The display is used to display a caller's name on the first line 46, in response to a name packet provided by the microprocessor 16, while the caller's telephone number is displayed on the second line 48, in response to a number packet provided by the microprocessor 16.

RAM

In this embodiment, the random access memory 18 is capable of storing 32k 8-bit words and may be read and written by the microprocessor 16 for retrieval and storage of data. Data stored in RAM is transferred to Electrically Erasable Programmable Read Only Memory ($E^2PROM$) (not shown) whenever a call is completed. This ensures that in the event of a power failure, information is retained, but at the same time may be updated.

ROM

In this embodiment, the read only memory 20 is capable of storing 64K 8-bit words and is configured to store a plurality of program codes operable to direct the microprocessor 16 to effect various functions to carry out a method according to the first embodiment of the invention. The program codes are selected such that read and write functions involving the random access memory 18 are made in one of four main address areas within an address range defined by the address bus.

Dial Directory

A first memory address area 50 acts as a dial directory and includes a plurality of memory registers in a first address range. This area is used to store a first set of telephone call event records 52 associated with telephone calls initiated by dialling on the keypad. Each record of this first set includes number and frequency fields 54 and 56, where the number 54 field is used to store a telephone number dialled on the keypad 26 and the frequency field 56 is used to store a frequency metric related to the number of times the number in the number field 54 is dialled. In this embodiment, the frequency metric is a number representing the number of times a number is dialled. Thus the frequency field acts as a frequency of use field.

Incoming Directory

A second memory address area 58 acts as an incoming directory and includes a plurality of memory registers in a second address range. This area is used to store a second set of telephone call event records 60 associated with telephone calls initiated by an outside caller calling into the user's telephone 12. Each record 60 of this second set includes number, name and frequency fields 62, 64 and 66 for storing a telephone number, a name of an incoming caller as provided by the CLID receiver 30 and a frequency metric related to the number of times the incoming caller identified by the CLID receiver 30 has called the user's telephone 12. In this embodiment, the frequency metric is a number representing the number of times the incoming caller identified by the CLID receiver 30 has called the user's telephone.

Personal Directory

A third memory address area 70 acts as a personal directory and includes a plurality of memory registers in a third address range. This area is used to store a third set of telephone call event records associated with parties the user is most likely to call. Each record of this third set includes name, number, characteristic, frequency and voice tag fields 72, 74, 76, 78 and 79. The name and number fields 72 and 74 identify the party and are used to store telephone numbers and names of parties with whom telephone calls have been conducted and the frequency field 78 stores a frequency metric related to the number of times a telephone call is conducted between the user and the party identified by the associated name and number fields. In this embodiment, the frequency metric is the number of times a telephone call is conducted with the party. The characteristic field 76 is used to store the characteristic representation produced by the voice recognition unit 28.

The voice tag field is operable to store the digitally recorded representation of a user-spoken name of the party, as produced by the voice recognition unit. The contents of the voice tag field are operable to be provided to the audio prompter 34 to cause the audio prompter 34 to provide an audible signal which the user can recognize and associate with the party identified by the name and number fields 72 and 74.

Variables

A fourth address area 80 acts as free memory which the microprocessor 16 can use for storing intermediate values in calculations and general parameters during the course of carrying out the method according to the first embodiment of the invention. This area is also used to keep a dial buffer 82, a pointer register 84, a CLID buffer 86 and input representation buffer 88, and an input buffer 89 all of which cooperate with program codes stored in the ROM.

Program Functionality

The program codes stored in the ROM 20 direct the microprocessor 16 to effect various functions which cooperate to carry out a method according to the first embodiment of the invention. The functions cooperate with each other in a manner depicted by various algorithms according to the first embodiment. This embodiment includes a dial algorithm, an incoming algorithm, an add algorithm, and a function algorithm.

Dial Algorithm

Figure 2A:
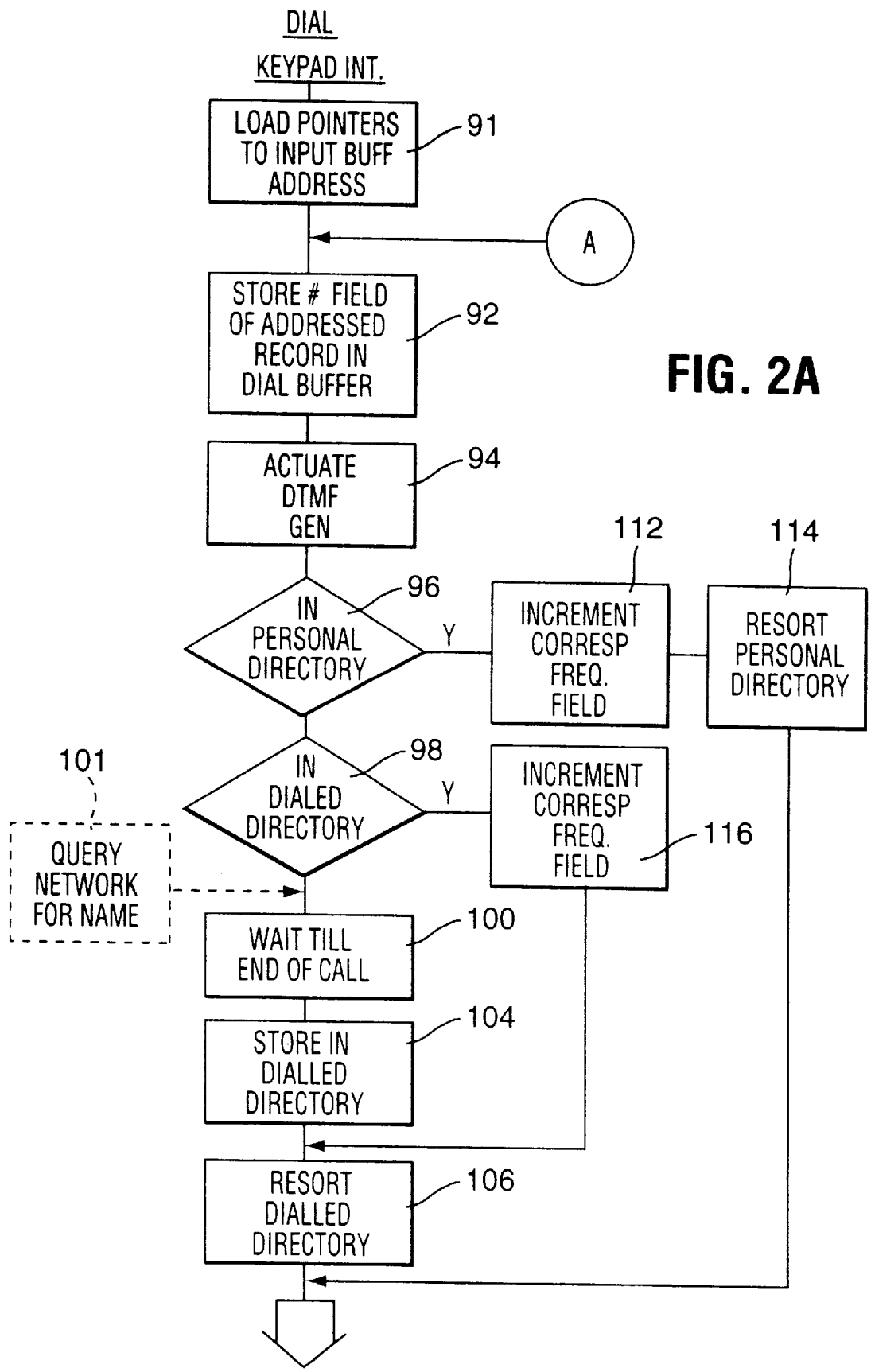
FIGS. 2A and 2B are flowcharts of a dial algorithm according to the first embodiment of the invention.
Figure 2B:
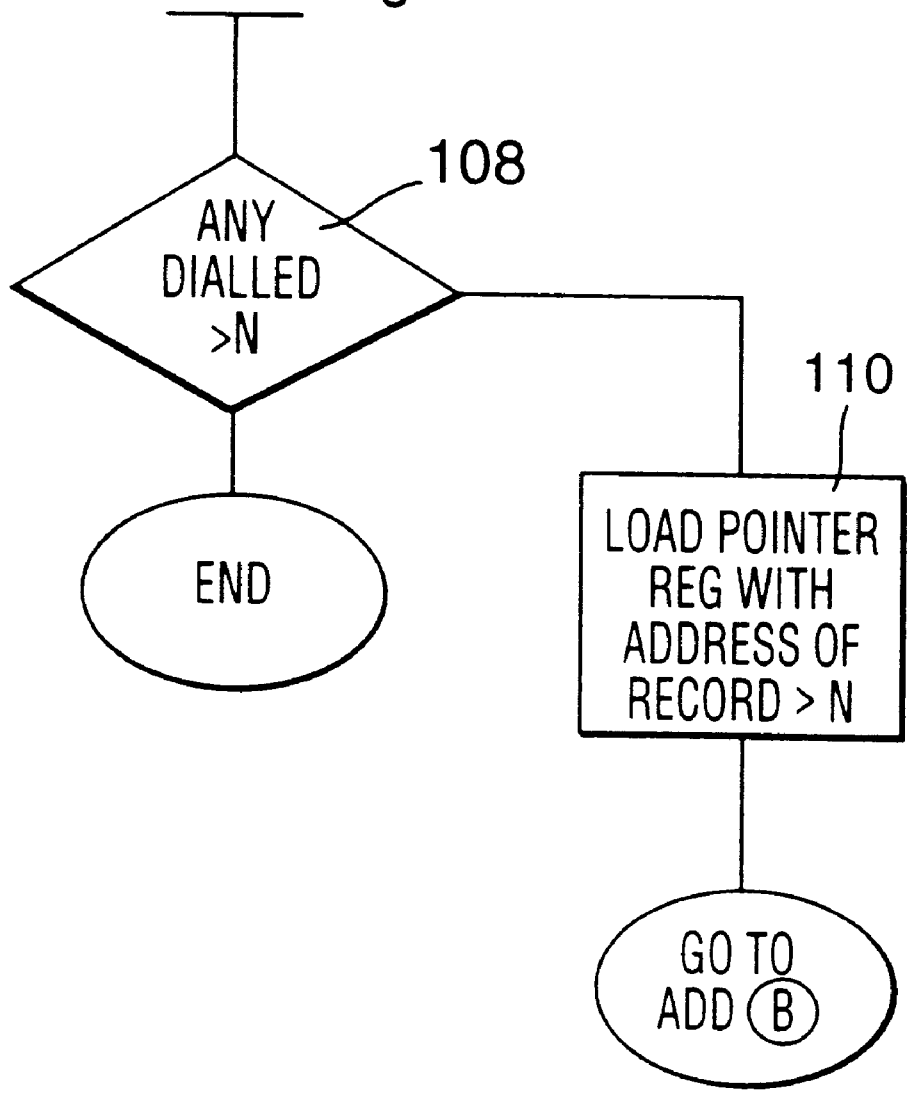

Referring to FIG. 2, the dial algorithm is shown generally at 90 and serves to perform dialling functions and maintain and update the dial directory. The dial algorithm includes a plurality of functional blocks representing blocks of program codes used to effect the functionality indicated in the corresponding block. Referring to FIGS. 1, 2a and 2b, the dial algorithm 90 is invoked upon receipt of a keypad interrupt at the microprocessor 16, from the keypad 26. The keypad 26 produces packets which are received at the input port 38 of the microprocessor 16. Block 91 directs the microprocessor to store the packets in the input buffer 89, and to load into the pointer register 84 the address of the input buffer 89. Block 92 directs the microprocessor 16 to store the contents of the number field of the record addressed by the contents of the pointer register 84 in the dial buffer 82 in the fourth address area 80 of the RAM 18. Block 94 then directs the microprocessor 16 to provide packets to the DTMF generator 32 in response to the keypad packets to generate dialling tones received by the central office in the usual manner, to establish a telephone call. Block 96 then successively addresses each record 71 in the personal directory 70 to determine whether or not the number just dialled is already in the user's personal directory 70. In other words, the personal directory is searched for a record associated with the called party. The microprocessor thus acts as a searcher. Where no corresponding record is found in the personal directory, block 98 directs the microprocessor 16 to successively address the records in the dial directory 50 to determine whether or not the number just dialled has been dialled before from the user's telephone 12. Thus, the dial directory is searched for a record corresponding to the called party. If a corresponding record is not found in the personal or dial directories, block 100 directs the microprocessor 16 to wait until the end of the call.

At the end of the call, when no corresponding record is found in the dial directory, block 104 directs the microprocessor 16 to store the number received from the keypad in the number field of the last record in the dial directory 50. Even if the last record in the directory contains data, such data is overwritten with the last called number. This is effected by copying the contents of the dial buffer 82 into the number field 54 of the last record in the dial directory. Upon copying the contents of the dial buffer 82, the contents of the frequency of use field 56 are set to 1. The microprocessor thus acts as an adder for adding a record to the dial directory.

Block 106 then directs the microprocessor 16 to re-sort the dial directory 50 based on the contents of the frequency of use fields 56 of the records. The microprocessor thus acts as a sorter. The records are sorted in descending order of frequency such that the record having the most frequently dialled number is the first record in the dial directory 50 and the record having the least frequently dialled number is the last record.

Block 108 then directs the microprocessor 16 to search the frequency fields 56 of each record in the dial directory 50 to determine whether or not any frequency fields 56 have contents greater than a pre-defined value n. If none meets this criteria, the dial algorithm 90 is completed. If a record meets this criteria, block 110 directs the microprocessor 16 to load into the pointer register 84 the address of that record and control of the microprocessor 16 is directed to the add algorithm at location B which prompts the user to indicate whether or not the record should be transferred to the personal directory.

In the dial algorithm 90, at block 96 if the just dialled number is found in the personal directory 70, block 112 directs the microprocessor 16 to increment by one the contents of the frequency field 78 of the corresponding record 71 in the personal directory 70. Block 114 then directs the microprocessor 16 to re-sort the personal directory 70 in an order dependent on the contents of the frequency fields 78 of the records in that directory. The records are sorted in descending order of frequency such that the record having the most frequently dialled number is the first record and the record having the least frequently dialled number is the last record. Processing is then directed to block 108 of the dial algorithm.

Similarly, at block 98 if the just dialled number is not found in the personal directory but is found in the dial directory, block 116 directs the microprocessor 16 to increment by one the contents of the frequency of use field 56 of the corresponding record in the dial directory 50 and processing continues at block 106 of the dial algorithm which sorts the records of the dial directory in an order dependent upon the contents of the frequency of use fields. The microprocessor thus also acts as an incrementer.

Incoming Algorithm

Figure 3:
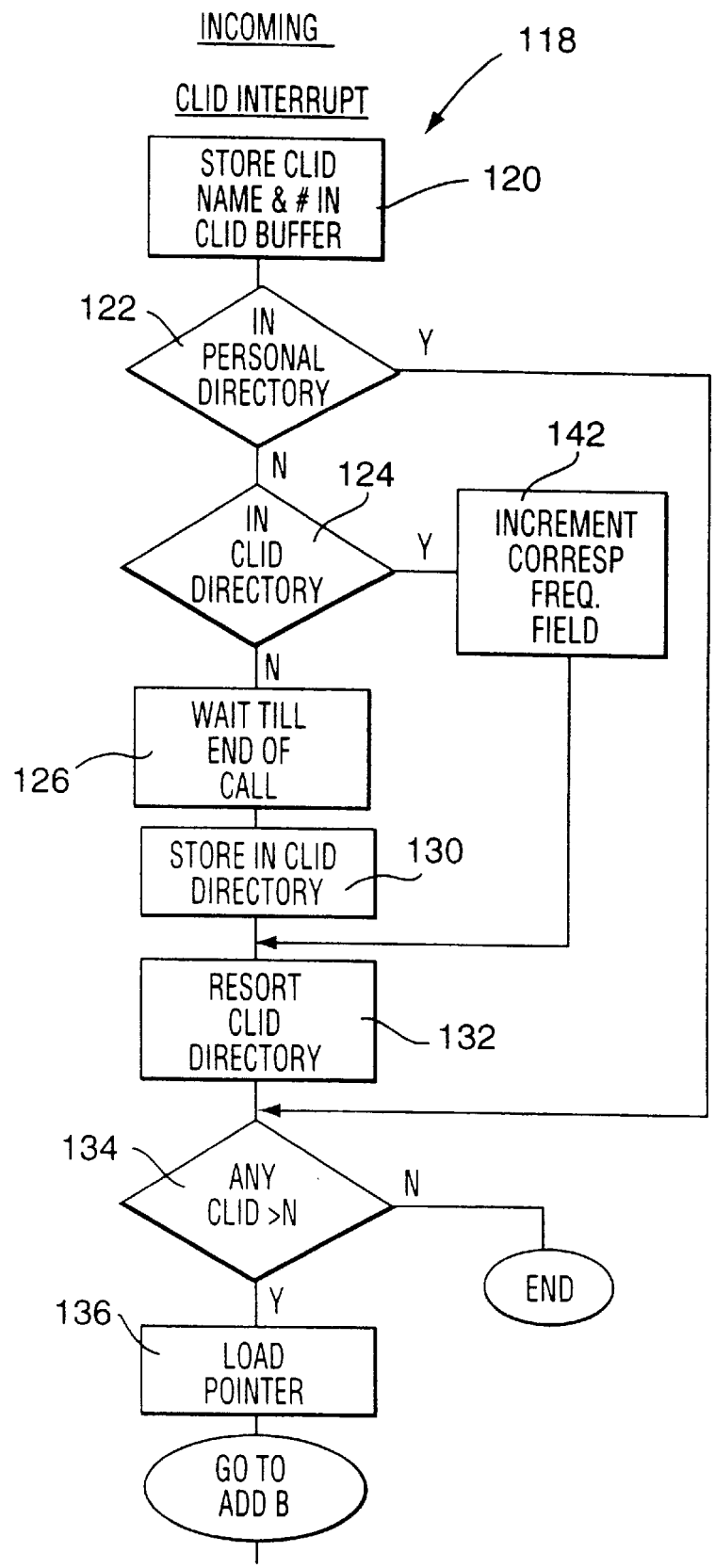
FIG. 3 is a flowchart of an incoming algorithm according to the first embodiment of the invention.

Referring to FIGS. 1 and 3, the incoming algorithm is shown generally at 118 and serves to load into the incoming directory 58 CLID caller identification information received from the central office. The incoming algorithm is invoked upon receipt of a CLID interrupt at the microprocessor 16, the CLID interrupt being produced by the CLID receiver 30. Upon receipt of the CLID interrupt, block 120 directs the microprocessor 16 to store, in the CLID buffer 86, CLID information including name and number data identifying the caller, as provided by the CLID receiver 30 to the input port 38 of the microprocessor 16.

Block 122 then successively addresses each record in the personal directory 70 to determine whether or not the CLID information just received is already in the user's personal directory 70. In other words, the personal directory is searched for a record associated with the calling party. Where no corresponding record is found in the personal directory, block 124 directs the microprocessor 16 to successively address the records in the incoming directory 58 to determine whether or not the CLID information just received and stored in the CLID buffer 86 has been received before. Thus the incoming directory is searched for a record corresponding to the calling party. If a corresponding record is not found in the personal or CLID directories, block 126 directs the microprocessor 16 to wait until the end of the call.

At the end of the call, where no corresponding record is found in the incoming directory, block 130 directs the microprocessor 16 to store the information received from the CLID receiver in the last record 60 in the incoming directory 58. Even if the last record in the directory contains data, such data is overwritten with the last received CLID information. This is effected by copying the contents of the CLID buffer 86 into the name and number fields 62 and 64 of the last record in the incoming directory 58. Upon copying the contents of the CLID buffer 86, the frequency of use field 66 of the new record is set to 1.

Block 132 then directs the microprocessor 16 to re-sort the incoming directory 58 based on the contents of the frequency fields 66 of the records. The records are sorted in descending order of frequency such that the record having the most frequently received CLID number is the first record in the incoming directory and the record having the least frequently received CLID number is the last record.

Block 134 then directs the microprocessor 16 to search the frequency fields 66 of each record 60 to determine whether or not any frequency fields 66 have contents greater than a pre-defined value n. If none meets this criteria, the incoming algorithm 118 is completed. If a record meets this criteria, block 136 directs the microprocessor to load the address of that record into the pointer register 84 and control of the microprocessor 16 is directed to the add algorithm at location B which prompts the user to indicate whether or not the record should be transferred to the personal directory.

In the incoming algorithm 118, at block 122 if the CLID information just received is found in the personal directory 70, processing is directed to block 134 of the incoming algorithm 118.

At block 124 if the CLID information just received is not found in the personal directory 70 but is found in the incoming directory 58, block 142 directs the microprocessor 16 to increment by one the frequency field 66 of the corresponding record 60 in the incoming directory 58 and processing continues at block 132 of the incoming algorithm.

Add Algorithm

Figure 4A:
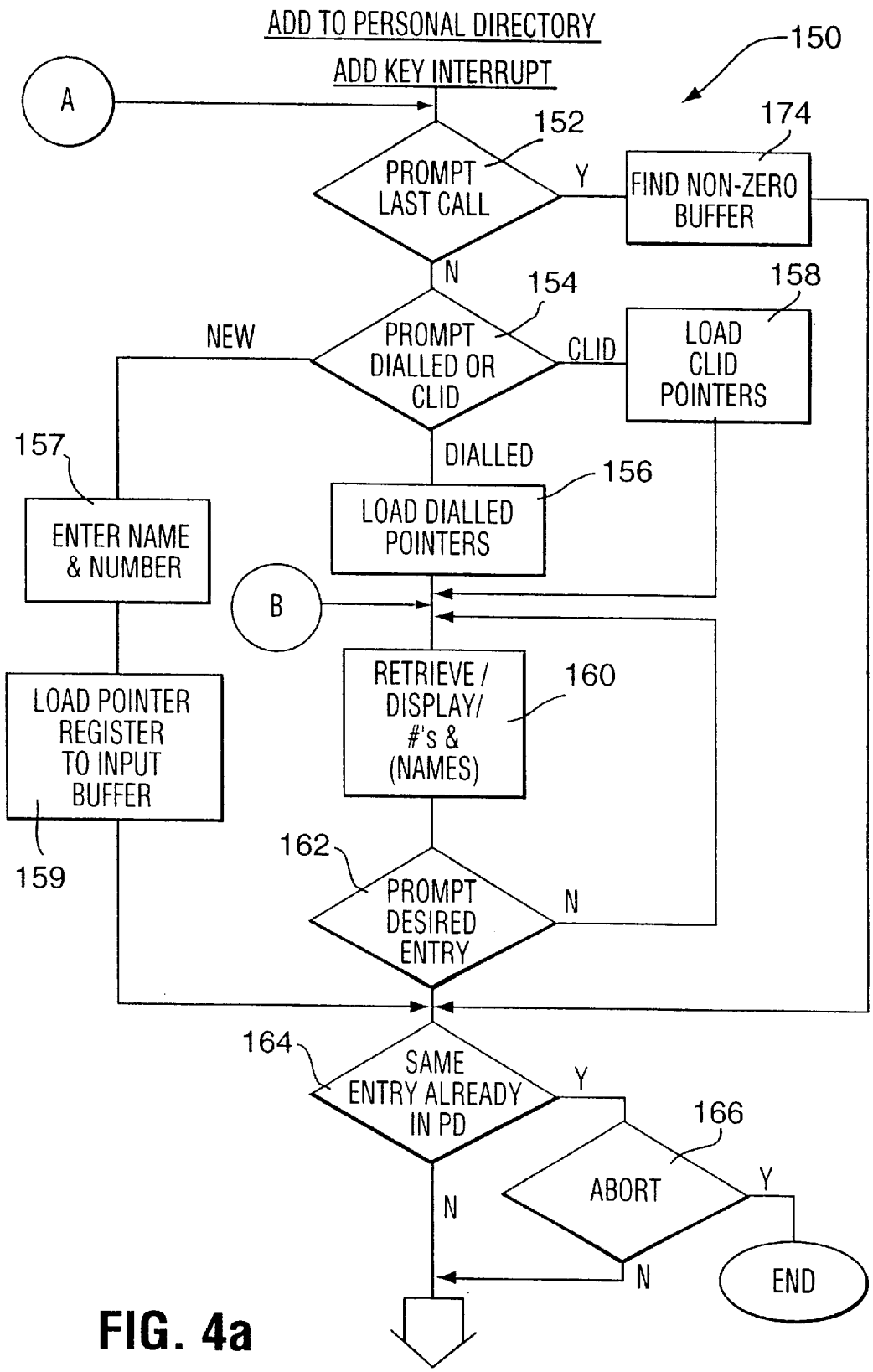
FIGS. 4A and 4B are flowcharts of an add algorithm according to the first embodiment of the invention.
Figure 4B:
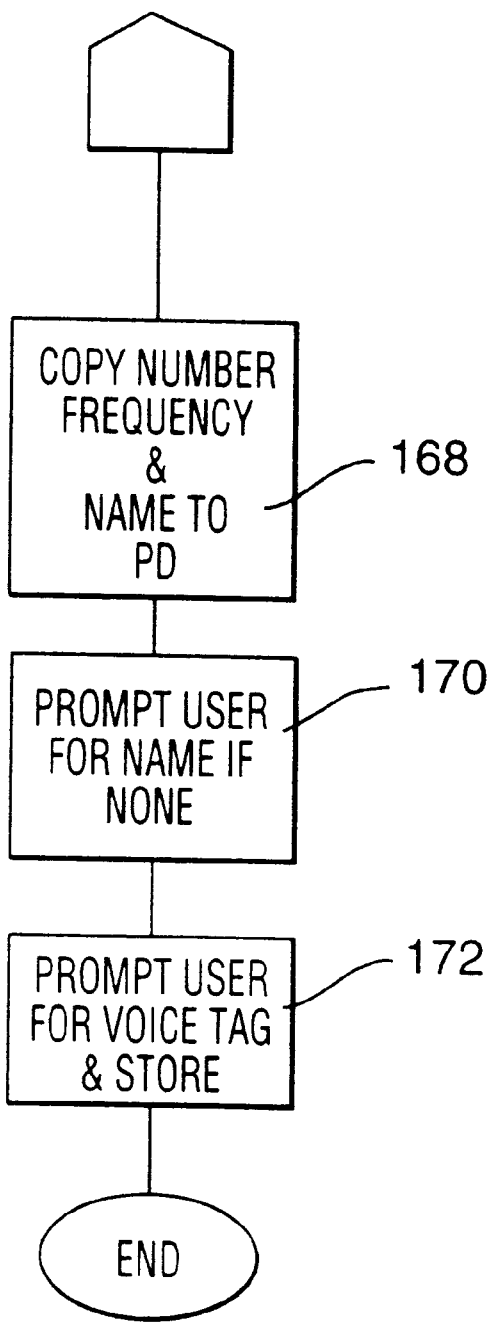

Referring to FIGS. 1, 4a and 4b the Add algorithm is shown generally at 150 and serves to add to the personal directory 70 new records obtained from the dial directory 56, the incoming directory 58 or which may be entered by the user via the keypad 26. The Add algorithm 150 is invoked upon receipt of an add key interrupt from the add key 42 on the keypad 26 or a call from the dial, incoming or voice recognition algorithms.

Upon invoking the Add algorithm 150, block 152 directs the microprocessor 16 to prompt the user to indicate whether or not the last dialled number or the last received CLID information is to be added as a record to the personal directory 70. The microprocessor prompts the user by writing to the display 36 appropriate indicia requesting user input and by writing to the audio prompter 34 a data packet or sound clip which causes the audio prompter to sound a prompt such as "LAST CALL".

The user may respond to such prompts either by keypad entry, or by simply speaking the words "YES" or "NO" into the voice recognition unit 28. The microprocessor, display and audio prompter thus act as a prompter.

If the user does not want to store such information, the user replies with the utterance "NO" and then block 154 directs the microprocessor 16 to prompt the user to indicate whether a record is to be copied from the dial directory 50 or the incoming directory 58 or whether a new record is to be added and wait for a command utterance from the user. If the user wishes to copy from the dial directory 50, block 156 directs the microprocessor 16 to store the address of the first record of the dial directory 50, in the pointer register 84. Similarly, if the user wishes to copy from the incoming directory 58, block 158 directs the microprocessor 16 to store the address of the first record in the incoming directory 58 in the pointer register 84.

If the user wishes to add a new record, block 157 prompts the user to enter name and number information via the keypad. This information is stored in the input buffer 89. Block 159 then loads into the pointer register 84 the address of the input buffer 89.

Block 160 marks the beginning of location B of the add algorithm and directs the microprocessor 16 to use the contents of the pointer register 84 to retrieve and display the contents of the number field 54, in the case of the dial directory or both the number and name fields 64, 62, in the case of the incoming directory, of the record addressed by the contents of the pointer register 84. Block 162 then directs the microprocessor 16 to prompt the user to indicate whether or not the currently displayed record is the one to be copied to the personal directory 70. If the currently displayed record is not the desired record, block 162 directs the microprocessor 16 to increment the contents of the pointer register 84 and return to block 160 which causes the contents of the newly addressed record to be displayed. In effect, blocks 160 and 162 permit the records in either the dial directory 50 or the incoming directory 58 to be scrolled on the display 36.

When the user reaches the desired record, a predefined response, which, in this embodiment, is a key press on the keypad, or an utterance by the user, signals that the currently addressed record is desired to be transferred to the personal directory. Or, when the user has chosen to add a new entry to the personal directory via the keypad and block 159 has been completed, block 164 then directs the microprocessor 16 to successively address each record 71 in the personal directory 70 to determine whether or not the desired entry has already been stored in the personal directory 70. If the record has already been stored, block 166 directs the microprocessor 16 to end the add algorithm 150. If the desired entry has not already been transferred to the personal directory 70, block 168 directs the microprocessor 16 to copy the record to the personal directory 70 as the last entry therein, unless the data in the last entry is non-zero, in which case the user is prompted for confirmation before overwriting the data of the existing last record in the directory. Thus, the record is transferred to the personal directory upon receiving a pre-defined response from the user. The microprocessor thus acts as a transferor for transferring to the personal directory a record of the called or calling party. Block 170 then directs the microprocessor 16 to prompt the user to edit the contents of the name field 72 by displaying the name and number portions of the record and waiting for the user to use the keypad 26 to enter new characters for the name field. Since in this embodiment, the dial records 52 do not contain name fields, whenever a dial record is copied to the personal directory 70, the user will probably want to add name information to the name field 72. Optionally, further processing instructions may be given to the microprocessor to cause it to query the network, possibly for a fee, to obtain name information.

Block 172 then directs the microprocessor 16 to prompt the user to enter a non-standard utterance which is received as an audible sound at the voice recognition unit 28. The voice recognition unit 28 may request some verification, after which the user's utterance is digitized and input representation packet is produced and forwarded to the input port 38 by the voice recognition unit 28. This voice packet is stored in the characteristic field 76 of the corresponding record 71 in the personal directory 70 and acts as a characteristic representation of at least one identifying characteristic of a rendering associated with the record. In this embodiment, the rendering is an oral utterance. The Add algorithm 150 is then ended.

Referring back to block 152 of the add algorithm 150, if the user chooses to add to the personal directory 70 the record associated with the last call, whether that call was made by the user or was an incoming call, block 174 directs the microprocessor 16 to read the contents of the dial buffer 82 and the CLID buffer 86 to determine which is non-zero, as the buffer having non-zero contents identifies the last call type. The dial buffer 82 contains only number data while the CLID buffer 86 contains number and name data, therefore, depending upon which type of call last occurred, just the number data is copied to the number field 74 of the last record in the personal directory 70 or both the number data and the name data is copied to the number field 74 and name field 72 respectively.

Function Algorithm

Figure 5:
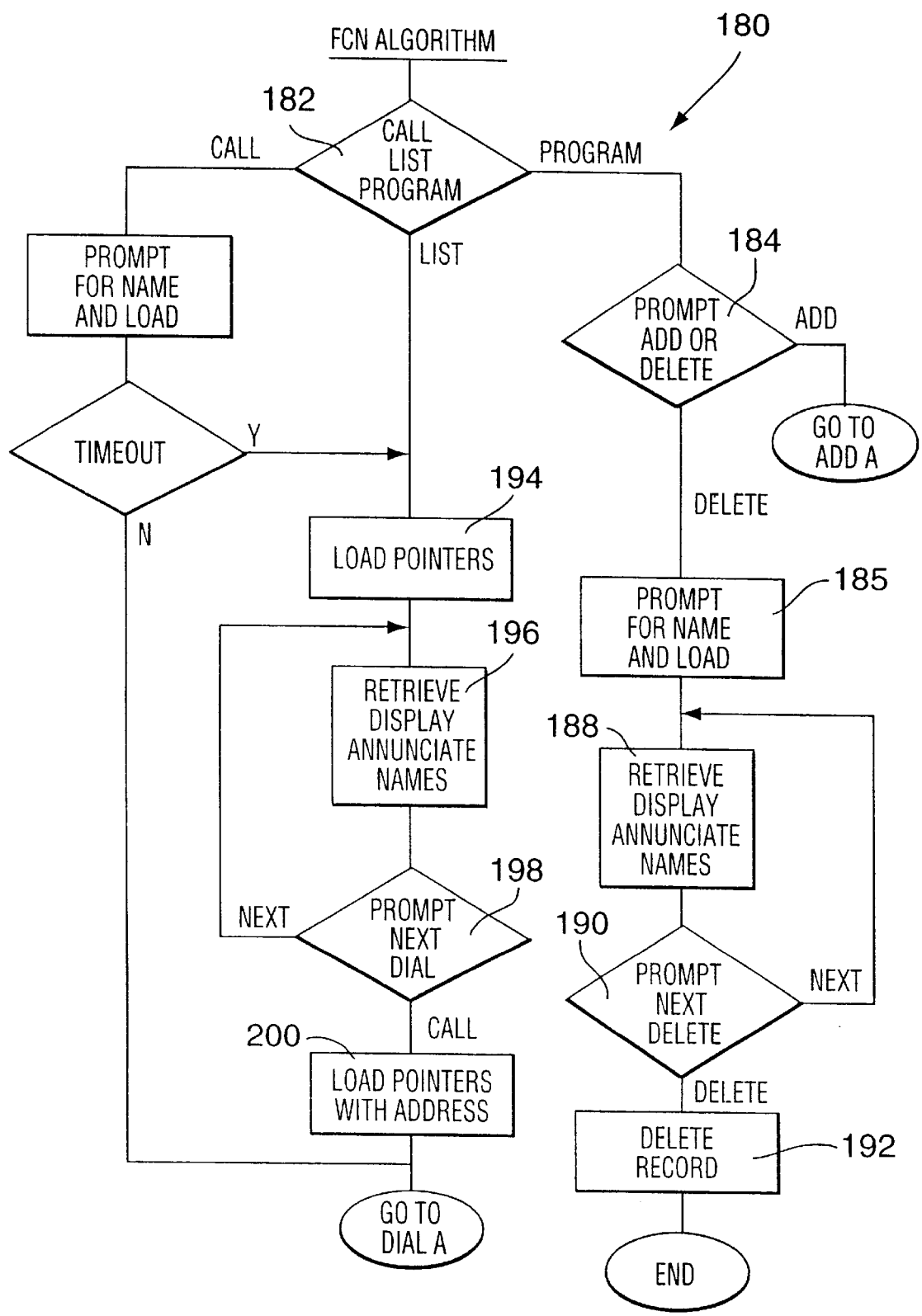
FIG. 5 is a flowchart of a function algorithm according to the first embodiment of the invention.

Referring to FIGS. 1 and 5, the function algorithm is shown generally at 180 and serves to enable the user to effect calling and programming instructions by keypad entry or simply by uttering voice commands recognizable to the voice recognition unit 28. The function algorithm is invoked upon receipt at the microprocessor 16, of a keypad interrupt in response to activation of a predefined key or key sequence.

Upon receiving an invocation of the function algorithm block 182 directs the microprocessor 16 to prompt the user for input by providing a data packet to the audio prompter 34 to cause it to sound clips of reconstructed speech to sound the words "CALL", "LIST" or "PROGRAM". The microprocessor also sends appropriate packets to the display to cause these prompts to be displayed on the display.

The user responds to the prompt by keypad entry or by uttering either of these words back to the voice recognition unit 28, which recognizes these utterances as commands and responds by providing to the input port 38 a packet indicating the word spoken or entered by the user. If the user has spoken the word "PROGRAM", block 184 directs the microprocessor 16 to prompt the user for further input by providing a packet to the audio prompter 34 to cause it to sound clips of reconstructed speech to sound the words "ADD" or "DELETE". If the user responds with the word "ADD", the microprocessor 16 is directed to location "A" of the Add algorithm 150 of FIGS. 4a and 4b and processing continues as described above in connection with the Add algorithm 150.

If the user responds with the word "DELETE", block 185 directs the microprocessor to wait for the user to say or enter the name associated with the record to be deleted. Upon the user entering the name, via the keypad, a pointer to the identified record is produced and stored in the pointer register 84. If the user utters the name to the voice recognition unit, the name is recognized as a non-standard command and a representation of the user's utterance or input representation is provided to the input port of the microprocessor and the first voice recognition algorithm is invoked.

Figure 6:
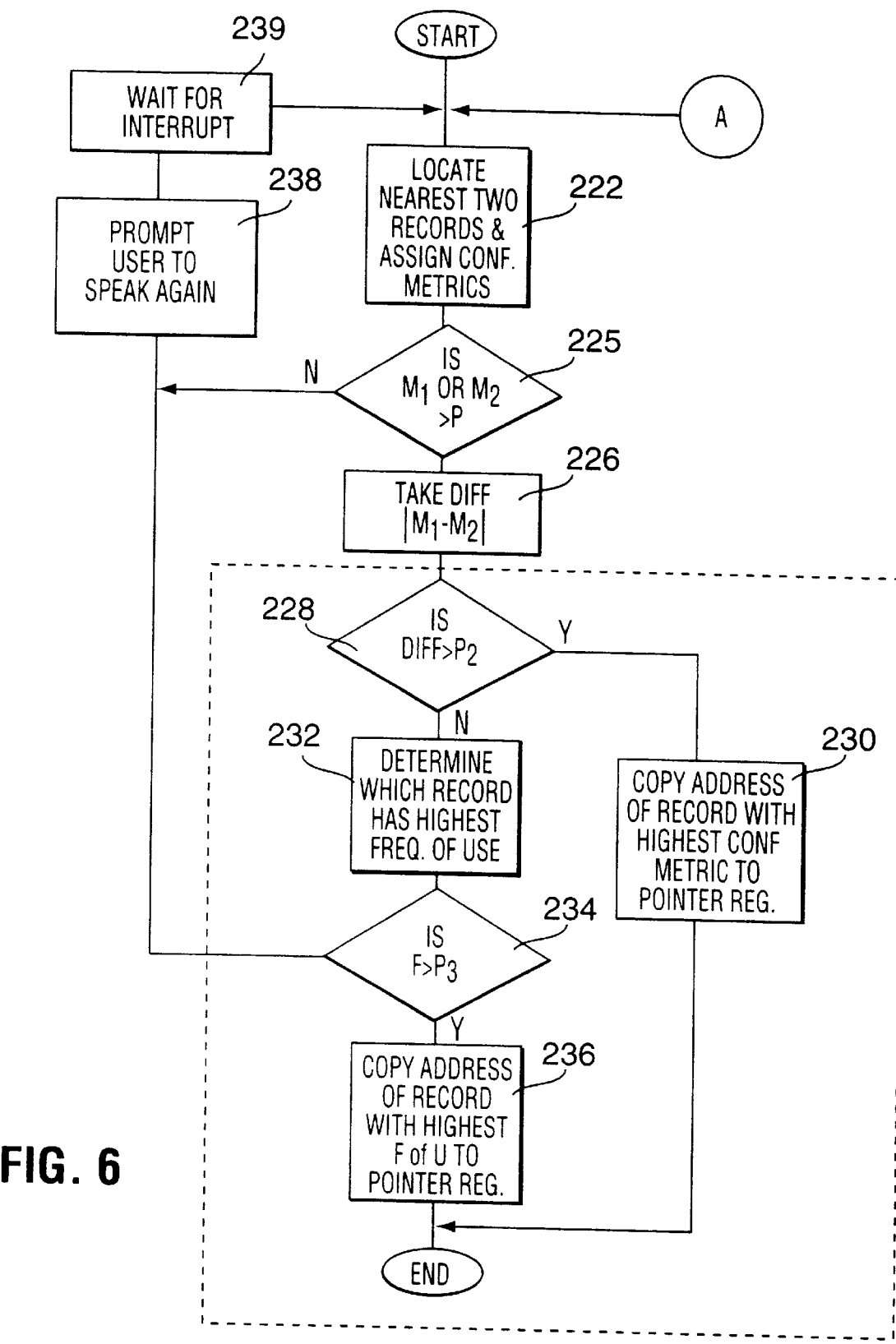
FIG. 6 is a flowchart of a voice recognition algorithm according to a first embodiment of the invention.

Referring to FIG. 6, the first voice recognition algorithm includes block 222 which directs the microprocessor 16 to compare the input representation with the contents of the characteristic fields of the records in the personal directory and assigns confidence metrics to the records respectively, each of the confidence metrics representing a respective probability that a respective record is the desired record. Block 222 also directs the microprocessor to determine the address locations of first and second personal directory records having characteristic field 76 contents statistically nearest to the voice packet in the input representation buffer 88, or providing the first and second best matches to the voice packet. Thus, block 222 determines which of the records have the first and second highest confidence metrics.

Block 225 then directs the microprocessor to compare the first and second confidence metrics to a first pre-defined value, and determines whether or not at least one confidence metric is greater than the first pre-defined value. If so, then block 226 directs the microprocessor 16 to take the difference of the confidence metrics to determine a number representing the similarity between the confidence metrics. If the number is small, both of the records located in the personal directory 70 have similar probability of being the closest match or identifying the desired record. If the number is large, one of the located records is considered to more probably be the desired record. The definition of large and small is preset by the manufacturer but may be altered by the user, by specifying that a difference above a second pre-defined value is considered to be a larger number and a difference below the second pre-defined value is considered to be a small number.

Block 228 directs the microprocessor 16 to compare the difference to the second pre-defined value and if the difference is greater than the second pre-defined value, block 230 directs the microprocessor 16 to copy the address of the record with the highest confidence metric to the pointer register 84 and end the algorithm.

If at block 228, the difference is less than the second pre-defined value, block 232 directs the microprocessor 16 to retrieve the contents of the frequency fields 78 of the first and second records and determine which is greater.

Block 234 then directs the microprocessor 16 to determine whether or not the contents of the frequency field of the record with the greater frequency field contents are greater than a third pre-defined value. If so, then block 236 directs the microprocessor 16 to copy to the pointer register 84 the address of the record with the greatest contents in the frequency of use field the algorithm is completed.

If the contents of the frequency field of the record having the greater contents in the frequency field are less than the third pre-defined value, block 238 directs the microprocessor 16 to prompt the user to speak the desired name again or cancel. Processing then continues at block 239 whereupon the microprocessor is directed to wait for a new input representation to be provided.

If at block 225, at least one confidence metric is not greater than the first pre-defined value, processing continues at block 238 which prompts the user to speak again or cancel.

In the above manner, where the first and second records with the highest confidence metrics are similarly statistically near the desired record, the selection of the desired record is made on the basis of the frequency of use of the first and second records. Thus the user's own habits are used in the determination of the desired record. The use of the user's own habits to select the desired record thus enhance the determination of the desired record, especially with the use of the voice recognition unit 28.

Referring back to FIG. 5, if the user fails to provide an utterance having a matching record, or fails to enter a name at the keypad such that the name has a matching record in the personal directory, the pointer register 84 is loaded with the address of the last record in the personal directory 70. The last record is the least frequently used record, and it is assumed that the record corresponding to the least frequently called party is the most desirable to delete to make room for a new entry if a more desirable record is not found.

Block 188 then directs the microprocessor 16 to retrieve, display and cause to be annunciated the contents of the name and number fields 72 and 74 of the identified or last record in the personal directory 70. To do this the microprocessor 16 retrieves the contents of the name, number and voice tag 72, 74 and 79 and forwards the contents of the name and number fields 72 and 74 to the display 36 for display on respective lines thereof and forwards the contents of the voice tag 79 to the audio prompter 34 which, in response, annunciates the name associated with the record 71.

Block 190 then directs the microprocessor 16 to prompt the user to indicate whether the next successive record is to be addressed or whether the currently addressed record is the one of interest. The microprocessor 16 transfers a packet to the audio prompter 34 causing it to annunciate the word "NEXT?" and waits for a reply or input to be received at the voice recognition unit 28. If the user responds with the word "DELETE", block 192 directs the microprocessor 16 to delete the currently addressed record 71 and the algorithm 180 is ended. If the user responds with the word "NEXT", the next successive record is addressed, (i.e. the next most frequently used record) and execution of the algorithm resumes at block 188 which retrieves, displays and causes to be annunciated this next successive record. By the user repeatedly responding with "NEXT" at block 190, the records in the personal directory 70 are successively addressed starting with the least frequently used record. Thus, the user is immediately directed to records which are most likely to be the most desirable to replace and user need not scroll through the personal directory records in the order in which they were entered. This, of course, saves time. In addition, this permits hands free operation of the apparatus which can be useful in areas such as a vehicle, where the user's hands and eyes are occupied with other matters.

If at block 182, the user responds with the word "LIST", the algorithm 180 enters a list branch which successively lists and annunciates the names and numbers in the personal directory and allows the user to select one to be dialled. The list branch begins with block 194 which directs the microprocessor 16 to load into the pointer register 84 the address of the first or last record in the personal directory 70, depending upon whether the user wishes to cause the names and numbers to be displayed in order of most frequently used record first or least frequently used record first. This selection may be pre-configured by the user. Alternatively, the records may be listed for the user in alphabetical order.

Assuming the user wishes to cause the records to be provided in order of decreasing frequency, block 196 then directs the microprocessor 16 to retrieve, display and cause to be annunciated the contents of the name and number fields 72 and 74 of the first record 71 in the personal directory 70. As before, the microprocessor 16 retrieves the contents of the name, number and voice tag fields 72, 74 and 79 of each record and forwards the contents of the name and number fields 72 and 74 to the display 36 for display on respective lines thereof and forwards the contents of the voice tag 79 to the audio prompter 34 which, in response, annunciates the name associated with the record 71.

Block 198 then directs the microprocessor 16 to prompt the user to indicate whether the next successive record is to be addressed or whether the currently addressed record is the one of interest. The microprocessor 16 transfers a packet to the audio prompter 34 causing it to annunciate the word "NEXT?" and waits for a command response to be received at the voice recognition unit 28. If the user responds with the word "CALL", block 200 directs the microprocessor 16 to load into the pointer register the address of the record currently displayed. The list branch of the algorithm 180 is thus completed and the microprocessor 16 is directed to continue processing at location "A" of the dial algorithm 90 shown in FIG. 2.

As above, if at block 198, the user replies with the word "NEXT", the next successive record is addressed and execution of the algorithm 180 resumes at block 196 which retrieves, displays and causes to be annunciated the next successive record. As above, by the user repeatedly responding with "NEXT" at block 198, the records in the personal directory may be successively addressed and displayed until the desired record is located.

If, at block 182, the user responds with the word "CALL", block 202 directs the microprocessor 16 to prompt for the name of the person to call.

If the user responds with input at the keypad, as the name is entered at the keypad, the name is received in the input buffer 89. Upon completion of the entry of the name at the keypad, the microprocessor searches the name fields of the records in the personal directory to locate the corresponding record. If a corresponding record is not found, the user the user is prompted for another name. If, on the other hand, a matching record is found, the address of the matching record is loaded into the pointer register and processing proceeds at Location A of the dial algorithm.

If, at block 202, the user simply speaks the name of the person he wishes to call, the voice recognition algorithm is called and responds by depositing into the pointer register 84, the address of the most probable matching record. Processing then resumes at location A of the dial algorithm.

Generally, the function algorithm acts to call, list or program records in the personal directory 70, in response to voice commands issued by the user of the telephone 12. In response to a call command, the algorithm 180 directs the microprocessor 16 to automatically dial the telephone number of a person identified by the user through a voice command. In response to a list command, the algorithm 180 directs the microprocessor 16 to cause to be visually displayed and annunciated the names of persons having call event records in the personal directory 70 and automatically dial the number stored in the number field 74 of a selected record 71. In response to a program command, the user can add or delete records 71 stored in the personal directory 70 by merely speaking appropriate commands.

It will be appreciated that continued use of the apparatus could result in the contents of the frequency of use fields of the records in the personal directory, the dial directory, and the incoming directory arriving at an overflow condition. To prevent this, the frequency of use fields of records in each of the directories, having values greater than zero are decremented at periodic intervals, such as once per month, or once per week, depending upon the intensity of usage of the apparatus. The microprocessor thus also acts as a decrementer.

Generally, it will be appreciated that the program memory stores a set of instructions readable by the microprocessor for directing the microprocessor to perform the functions of the searcher, the incrementer, the decrementer, the adder, the prompter and the transferor.

Alternatives

Figure 7:
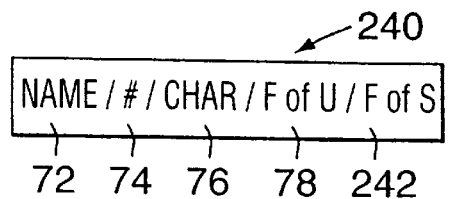
FIG. 7 is a schematic diagram of a record according to a second embodiment of the invention.

Referring to FIG. 7, a personal directory record according to a second embodiment of the invention is shown generally at 240. The record has name, number, characteristic, and frequency of use fields 72, 74, 76 and 78 as in the first embodiment but further includes a frequency of success field 242 for storing a number representing the frequency of success of matching the input representation of a name uttered by the user with the contents of the characteristic field of the record. Initially, the frequency of success field 242 is set to zero, but is updated in accordance with a second voice recognition algorithm which is a combination of the voice recognition algorithm shown in FIG. 6 and a determination algorithm shown in FIG. 8, according to the second embodiment of the invention.

Figure 8:
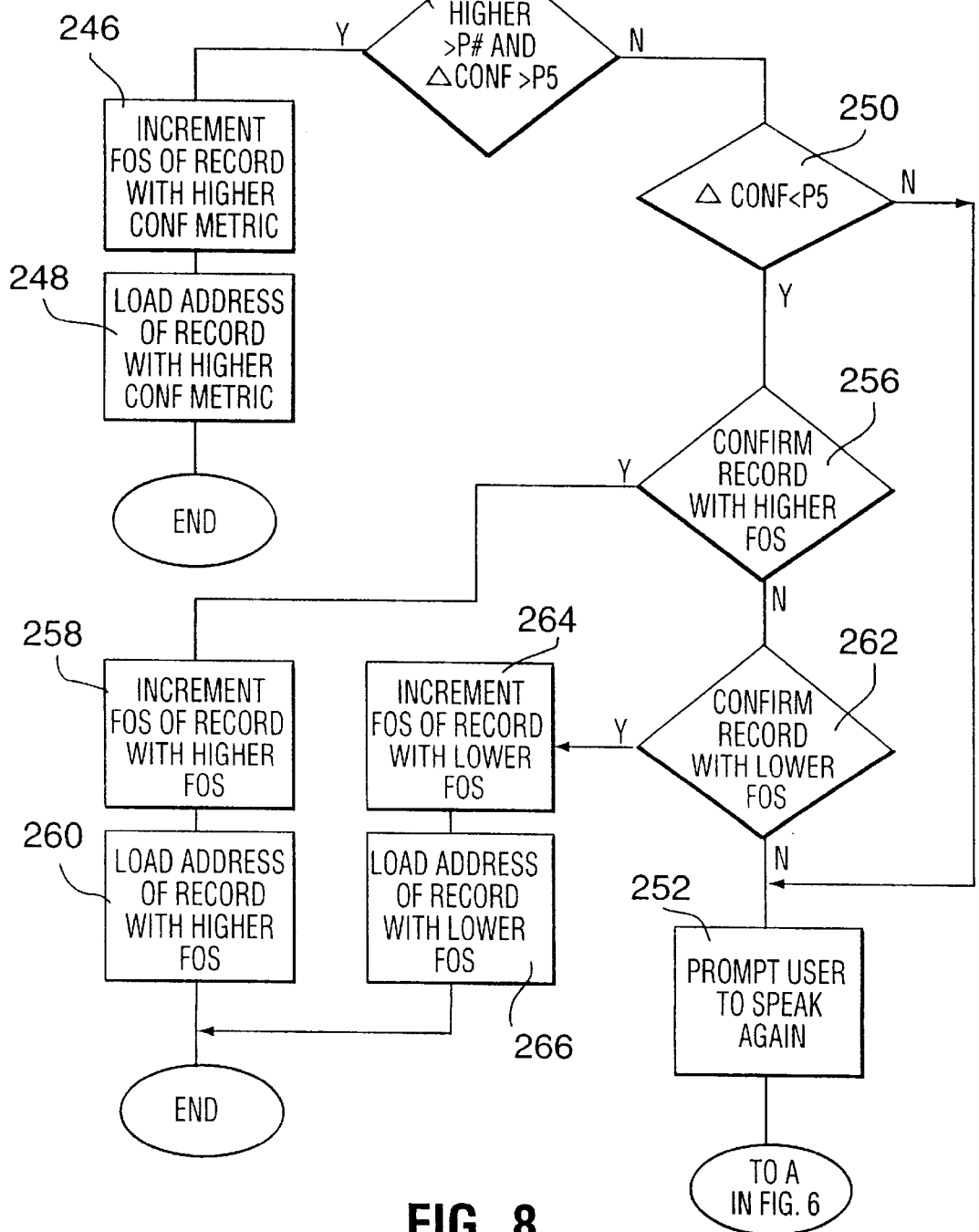
FIG. 8 is a flowchart of a determination algorithm according to the second embodiment of the invention.

Referring to FIG. 6, the second voice recognition algorithm includes blocks 222, 225 and 226 of the first voice recognition algorithm, but replaces the remainder of the first voice recognition algorithm with the blocks of the determination algorithm shown in FIG. 8. Thus, after block 226 of the first voice recognition algorithm in FIG. 6, block 244 of FIG. 8 directs the microprocessor 16 to determine whether or not the higher confidence metric, determined at block 222 in FIG. 6, is greater than a fourth pre-defined value and at the same time whether or not the difference in confidence metrics is greater than a fifth pre-defined value. If so, then the record with the highest confidence metric is considered to be the desired record. Block 246 directs the microprocessor 16 to increment the frequency of success field (242 in FIG. 7) of the record with the higher confidence metric and block 248 directs the microprocessor 16 to load into the pointer register (84 in FIG. 1) the address of the record with the higher confidence metric. The algorithm is then ended.

If the result of the determination at block 244 is negative, it is considered that there is no record which clearly appears to be the desired record. In this case block 250 directs the microprocessor 16 to determine whether or not the difference in confidence metrics is less than the fifth pre-defined value. In other words, the microprocessor determines whether or not the first and second confidence metrics are statistically near each other. If not, then block 252 directs the microprocessor 16 to prompt the user to repeat the utterance and continue processing at location A in FIG. 6.

If the difference in confidence metrics is less than the fifth pre-defined value, block 256 directs the microprocessor 16 to read the contents of the frequency of success fields 242 of the corresponding first and second records and annunciate the name provided by the contents of the voice tag field 79 of the first record, i.e., the record with the higher frequency of success. If the user confirms that the annunciated record is the desired record, block 258 directs the microprocessor 16 to increment the frequency of success field 242 of the first record and block 260 directs the microprocessor 16 to load into the pointer register 84 the address of the record with the higher frequency of success. The algorithm is then ended.

On the other hand, if the user does not confirm that the record with the higher frequency of success is the desired record, block 262 directs the microprocessor 16 to annunciate the name provided by the contents of the voice tag field 79 of the second record, i.e., the record with the lesser frequency of success. If the user confirms that the annunciated record is the desired record, block 264 directs the microprocessor 16 to increment the frequency of success field 242 of the second record and block 266 directs the microprocessor 16 to load into the pointer register 84 the address of the record with the lesser frequency of success. The algorithm is then ended.

If, at block 262, the user cannot confirm that the desired record is the record with the lower frequency of success, the microprocessor is directed to block 252 which directs the microprocessor 16 to prompt the user to repeat the utterance and continue processing at location A in FIG. 6.

It will be appreciated that continued use of the voice recognition algorithm according to the second embodiment of the invention could result in the contents of the frequency of success fields arriving at an overflow condition. To prevent this, the frequency of success fields having values greater than zero are decremented at periodic intervals, such as once per month, or once per week, depending upon the intensity of usage of the apparatus.

While the determination algorithm shown in FIG. 8 has been described in connection with the frequency of success field, it would be possible to replace the frequency of success field with a frequency of use field as discussed in connection with FIG. 6, and the decisions made at blocks 256 and 262 and resulting paths could be made on the basis of the contents of frequency of use field. Generally, the use of the determination algorithm of FIG. 8 with the frequency of use field is desirable where the user places a large number of outgoing calls and the use of the determination algorithm with the frequency of success field is desirable where the user uses the voice recognition aspects of the invention extensively. It is also possible to use the determination algorithm of FIG. 8 with both the frequency of use field and the frequency of success field, both of which may be used additively as a compound frequency value or weighting factors may be used with each frequency value.

Figure 9:
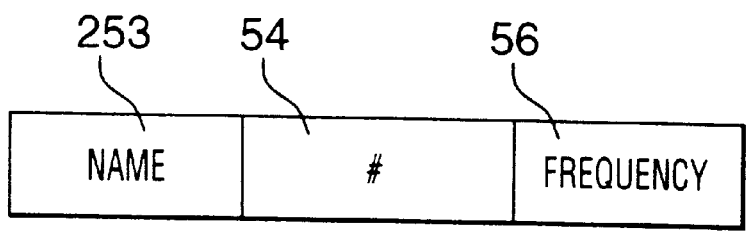
FIG. 9 is a schematic diagram of a dial directory record according to a third embodiment of the invention.
Figure 10:
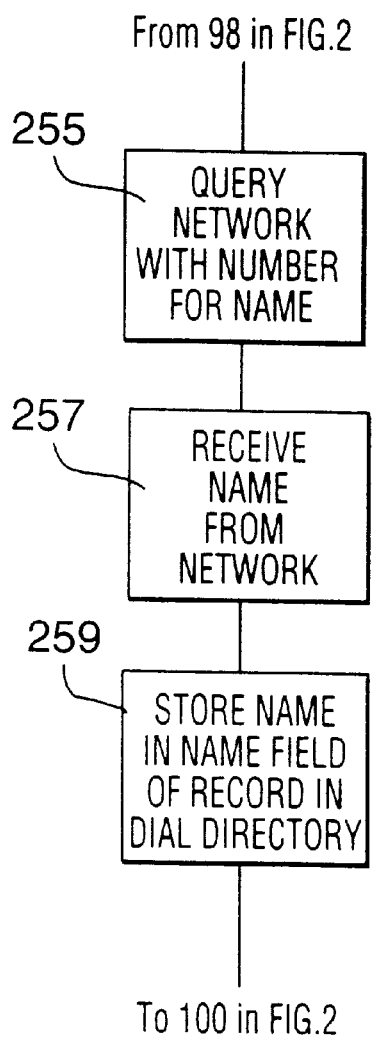
FIG. 10 is a portion of a dial routine according to the third embodiment of the invention.

Referring to FIG. 9, in a third embodiment of the invention, the records in the dial directory include a name field 253 in addition to the number and frequency fields 54 and 56 discussed in connection with the first embodiment. Referring to FIG. 10, in this alternative embodiment the dial routine shown in FIG. 2, includes an additional sequence of instructions between blocks 98 and 100. This additional sequence of instructions is shown at 253 in FIG. 10 and includes block 255 which queries the telephone network, ie. the central office, for the name of the party associated with the telephone number dialled by the user. The central office responds with the corresponding name in a CLID format which is received by the CLID receiver and handled by the microprocessor at block 257. Block 259 directs the microprocessor to deposit into the name field (253 in FIG. 9) of the corresponding record in the dial directory, the name information received from the network. This eliminates the need for the user to painstakingly enter the names of called parties.

It will be appreciated that while the apparatus according to the first embodiment of the invention has been described as being in a telephone, it will be appreciated that the apparatus may alternatively be located in a Private Branch Exchange (PBX) or other customer premise equipment or at a central office or other form of network location.

Figure 11:
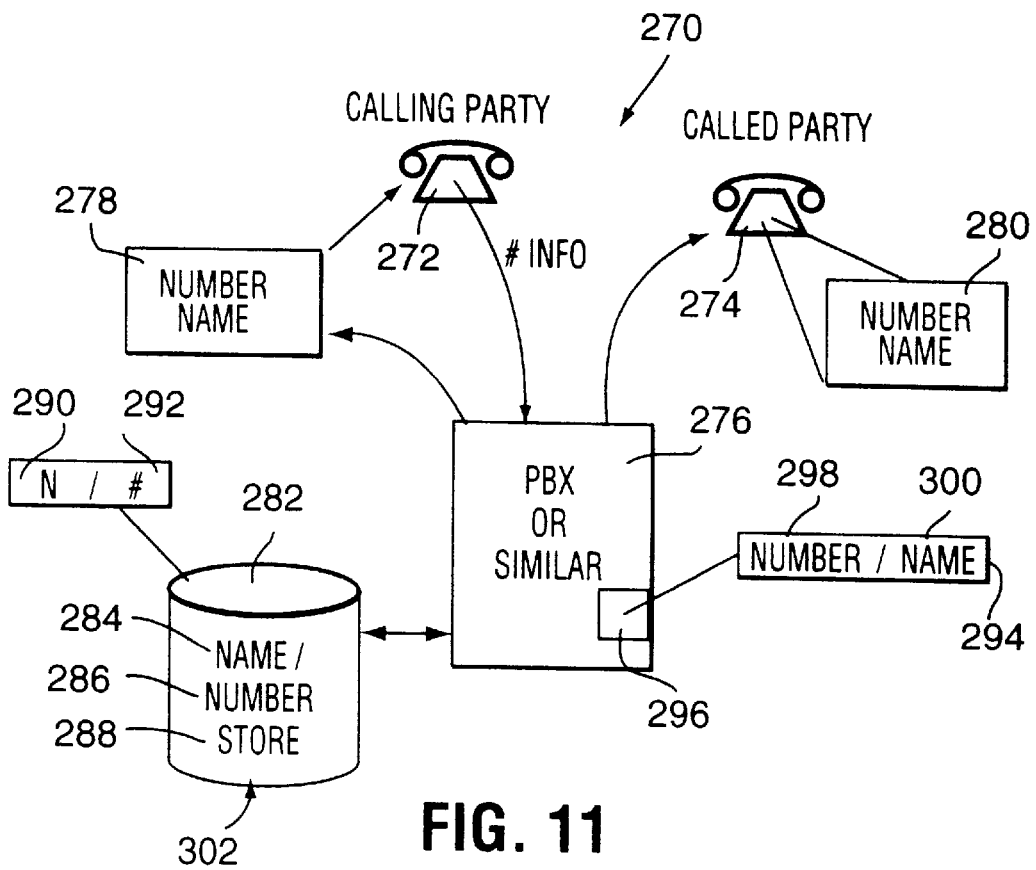
FIG. 11 is a schematic diagram of an apparatus according to a fourth embodiment of the invention.

Referring to FIG. 11, a fourth embodiment of the invention is shown generally at 270. This embodiment includes first and second telephones 272, 274 connected to a PBX 276, each telephone having a respective display 278, 280 for displaying a name and a telephone number. The PBX 276 further includes a data storage device 282, in this embodiment a hard disk, for storing a dial directory 284, an incoming directory 286 and a personal directory 288 for each user, similar to those discussed in connection with the first embodiment of the invention. The records in the dial directory 284, however, have name fields 290 and number fields 292, and the dial buffer 294 in RAM 296 includes a name portion 298 and a number portion 300.

A processor (not shown) in the PBX 276 is used to execute the dial algorithm, the incoming algorithm, and the add algorithm disclosed in connection with the first embodiment of the invention.

In operation, at the time of installation, telephone numbers or extension numbers are assigned to users and records are created at the PBX 276, in a look-up directory 302, to store name and number information for each user. This information is used as look-up information as required. As a user makes a call, the associated individual dial directory 286 is updated accordingly, with both name and number information obtained from the look-up directory 302. In addition, the incoming directories associated with each user keep track of calls received by respective users. When a user makes a call outside of the PBX 276, the PBX 276 may request name information from a central office or other network location (not shown) in the form of CLID information and this may be used to complete the name fields of the records in the incoming directory.

Each user also has the option of adding or deleting records in the personal directory as discussed in connection with the first embodiment of the invention. In addition, each user can dial a number from his/her own personal directory, as discussed in connection with the first embodiment of the invention.

Optionally, the personal, dial and CLID directories could be positioned between the PBX and the telephone sets. For example, they may all be in each set, with the PBX only serving to provide the name information to the dial directory in the set. Or, only the personal directory could be stored in the set and the rest of the functions located in the PBX. Similarly, the speech recognition could be centrally located as an adjunct to the PBX.

Figure 12:
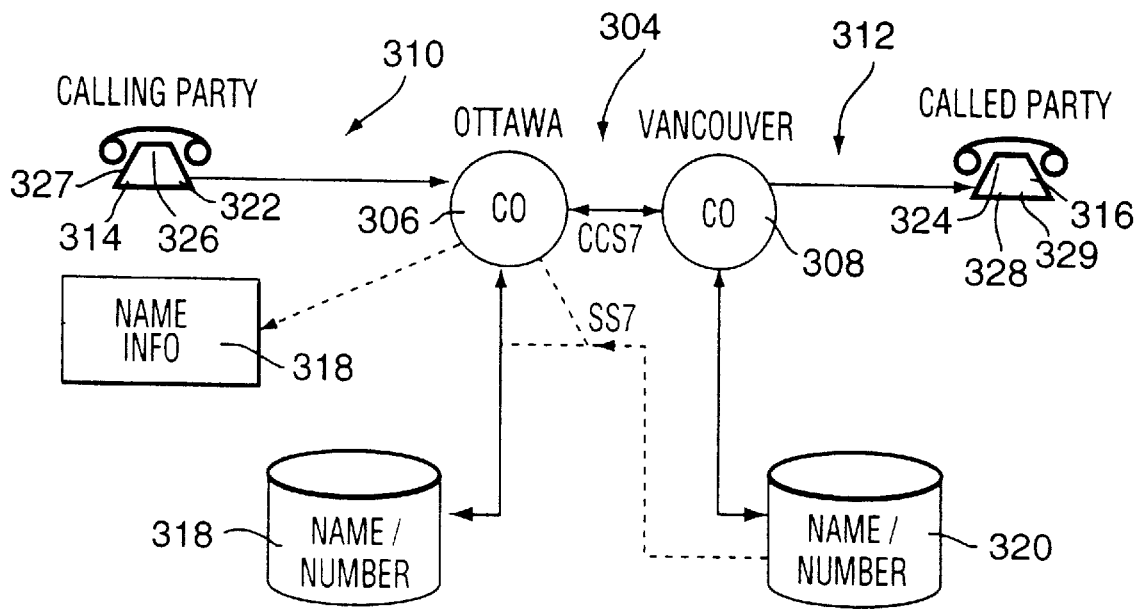
FIG. 12 is a schematic diagram of an apparatus according to a fifth embodiment of the invention.

Referring to FIG. 12, in a fifth embodiment of the invention, shown generally at 304, look-up directories may be kept for users in a much larger area, such as that serviced by a central office, or other network location. In this embodiment, there are first and second central offices, or network locations 306 and 308 with first and second pluralities 310 and 312 of telephones 314 and 316 connected thereto. Each central office 306, 308 keeps its own look-up directory 318 and 320 respectively. Each telephone 314 and 316 keeps its own dial directory 322 and 324 respectively incoming directory 326 and 328, and personal directory 327 and 329 as discussed in connection with the first embodiment.

When the first telephone 314 makes a call, the first central office 306 identifies the caller by noting the line termination and finding the corresponding user record in the first look-up directory 318. Upon finding the record, name and number information of the caller is sent to the second central office 308 using Common Channel Signalling Seven (CCS-7) protocols. At the second central office 308, the name and number information of the first caller is converted into a CLID format and is provided to the second telephone 316 for display. At the same time, the second central office 308 locates in the second look-up directory 320, the name and telephone number associated with the second telephone 316 and sends this information to the first central office 306, again using Common Channel Signalling Seven (CCS-7) protocols. At the first central office 306, the name and number information relating to the called party is converted into a CLID format and is provided to the first telephone. In this manner, calling party display information is transferred between central offices.

As a variation on the embodiment shown in FIG. 12, individual dial directories and incoming directories are stored at respective central offices, while each telephone keeps only a personal directory 327 and 329 respectively. Information relating to outgoing calls is tracked and stored centrally by the respective central offices and at a time interval, perhaps monthly with regular billing, the central office may offer to update a user's personal directory with new names and telephone numbers of parties called frequently but which are not in the user's personal directory. This is done by providing to the requesting user a stream of data in a CLID format over the telephone line. The individual telephone can respond as explained in connection with the incoming algorithm and the user can make the desired transfers to this personal directory.

Figure 13:
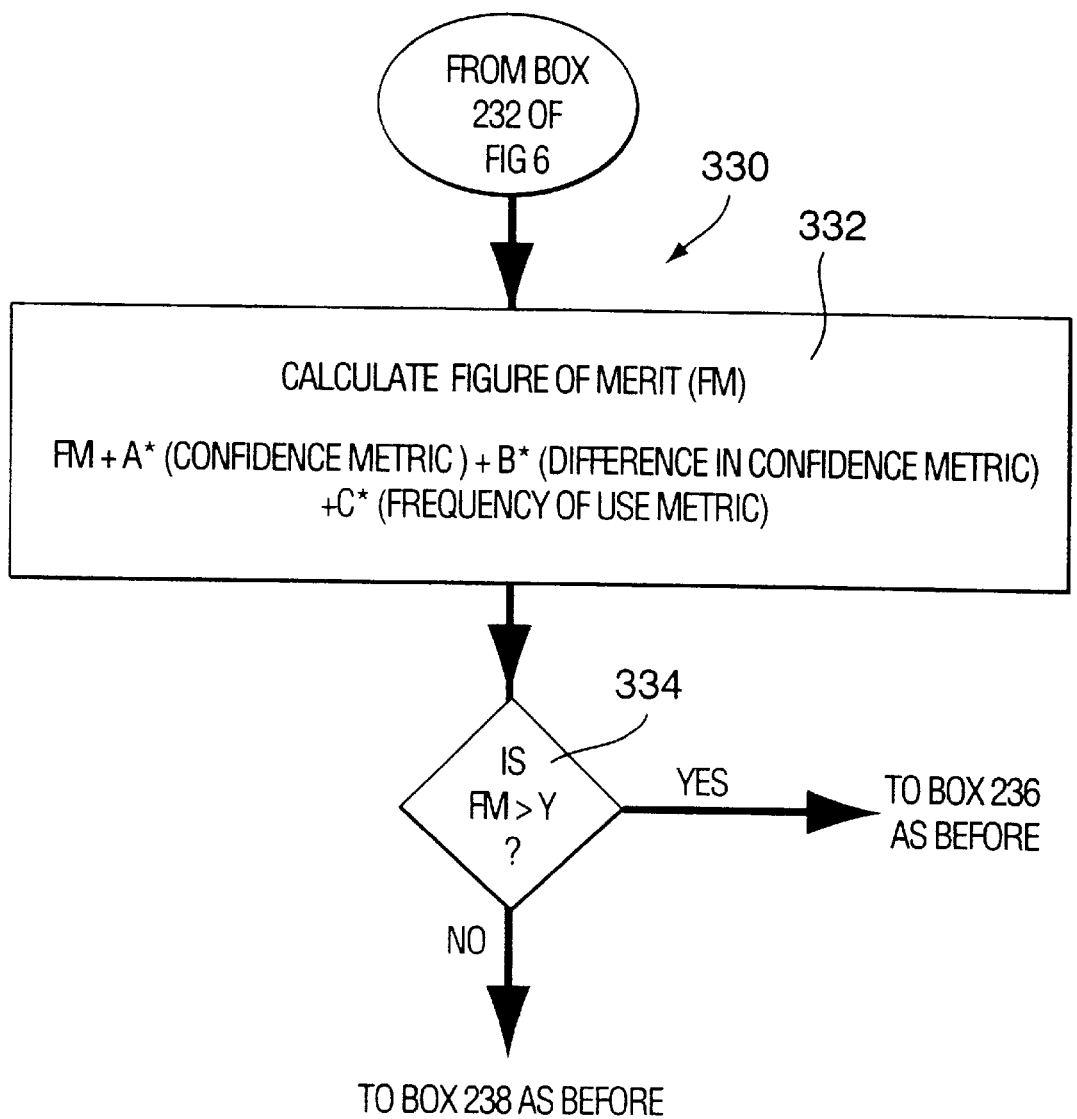
FIG. 13 is a portion of a flowchart depicting a method of selecting a desired record, according to a sixth embodiment of the invention.

Referring to FIG. 13, a sixth embodiment of the invention includes instructions operable to direct the processor to perform the functions shown generally at 330, to determine and act on a Figure of Merit. In this embodiment the functions shown at 330 replace blocks 234 and 236 in FIG. 6. Referring to FIGS. 6 and 13, at block 232, a possible record to be considered the desired record is determined as being that record, of the two records associated with the first and second highest confidence metrics, which has the highest frequency of use value. Knowing this, block 332 of FIG. 13 directs the microprocessor to calculate a Figure of Merit based on a weighted sum of the confidence metric associated with the possible record, the difference between the first and second confidence metrics of the two records having the first and second highest confidence metrics, and the contents of the frequency of use field of the possible record. In other words, the Figure of Merit is calculated according to the following formula:

$$FM = A^*(cm1) + B^*|cm1 - cm2| + C^*(f)$$

Where:

FM=Figure of Merit

A=Weighting factor for first confidence metric cm1=confidence metric of the record associated with cm1 or cm2 having the highest frequency contents B=Weighting factor for confidence metric difference cm2=second Confidence metric C=weighting factor associated with frequency of use metric f=frequency of use metric associated with record having the highest frequency of use After calculating the frequency of use metric, block 334, directs the microprocessor to determine whether the Figure of Merit is greater than a sixth pre-defined value. If the Figure of Merit is less than the sixth pre-defined value, processing continues at block 238 of FIG. 6. If the Figure of Merit is greater than the sixth pre-defined value, block 334 directs the microprocessor to block 236 of FIG. 6 which copies to the pointer register 84 the address of the record with the greatest value in the frequency of use field and the algorithm is ended.

The functions shown in FIG. 13 provide a way in which the confidence metrics and the frequency of use field are used in combination to determine which record is to be selected. The weights with which the confidence metric, the difference in confidence metrics and the frequency of use are considered in determining whether or not to select a record as the desired record can be adjusted to suit the user's anticipated operating habits.

It will be appreciated that the functionality provided by the algorithms disclosed herein may be provided by instruction codes stored on a processor or computer readable media and rendered operable to configure a general purpose computer to perform the indicated functionality. The specific combination of functional blocks provided herein may be implemented in a variety of processor or computer-readable instruction sets or computer languages without departing from the invention disclosed herein.

While specific embodiments of the invention have been described and illustrated, such embodiments should be considered illustrative of the invention only and not as limiting the invention as construed in accordance with the accompanying claims.

What is claimed is:

1. A method of locating a desired record amongst a plurality of records in a telephone directory, the method comprising:

a) associating a frequency field with each of said records, said frequency field being operable to store a frequency metric representing the frequency of use of said record, based on incoming and outgoing calls;

b) associating a characteristic field with each of said records, said characteristic field being operable to store a characteristic representation of at least one identifying characteristic of a rendering associated with said record;

c) producing an input representation of a rendering purporting to identify said desired record;

d) comparing said input representation with the contents of the characteristic fields of at least some of said records and assigning confidence metrics to said records respectively, each of said confidence metrics representing a respective probability that a respective record is the desired record;

e) determining which of said records have the first and second highest confidence metrics; and f) selecting said desired record from said records having the first and second highest confidence metrics, as a function of said first and second highest confidence metrics and the frequency metrics of said records having the first and second highest confidence metrics.

2. A method as claimed in claim 1 further comprising increasing the contents of the frequency field of the desired record.

3. A method as claimed in claim 1 further comprising determining whether at least one of said first and second highest confidence metrics has a value greater than a first pre-defined value.

4. A method as claimed in claim 3 further comprising determining a difference between said first and second highest confidence metrics.

5. A method as claimed in claim 4 further comprising when said first highest confidence metric is greater than said first pre-defined value and said difference is greater than a second pre-defined value, selecting as said desired record the record associated with the first highest confidence metric.

6. A method as claimed in claim 4 further comprising including the step of when said first highest confidence metric is greater than said first pre-defined value, and said difference is less than a second pre-defined value, selecting as said desired record the record associated with the first highest frequency metric when said first highest frequency metric is greater than a third pre-defined value.

7. A method as claimed in claim 6 comprising, where said first highest frequency metric is less than said third pre-defined value, prompting a user to repeat the rendering.

8. A method as claimed in claim 7 wherein producing an input representation of a rendering comprises digitizing an utterance made by the user.

9. A method as claimed in claim 8 further comprising receiving an oral utterance from said user.

10. A method as claimed in claim 4 further comprising, when said first highest confidence metric is not greater than a fourth pre-defined value or said difference between said confidence metrics is not greater than a fifth pre-defined value, and when said difference in confidence metrics is less than said fifth pre-defined value, determining which of said records having the first and second highest confidence metrics has the first highest frequency metric and prompting a user to confirm that the record having the first highest frequency metric is the desired record.

11. A method as claimed in claim 10 further comprising, where the user confirms that the record having the first highest frequency metric is the desired record, selecting as the desired record, the record associated with the first highest frequency metric.

12. A method as claimed in claim 10 further comprising, where the user denies that the record having the first highest frequency metric is the desired record, prompting the user to confirm that the record having the second highest frequency metric is the desired record.

13. A method as claimed in claim 12 further comprising where the user confirms that the record having the second highest frequency metric is the desired record, selecting as the desired record, the record which has the second highest frequency metric.

14. A method as claimed in claim 12 further comprising where the user denies that the record having the second highest frequency metric is the desired record, prompting the user to repeat the rendering.

15. A method as claimed in claim 1 further comprising:

a) determining which of said records having the first and second highest confidence metrics has the highest value in its frequency field;

b) determining a figure of merit based on a weighted sum of the confidence metric associated with the record having the frequency field with the highest value, the difference between the first and second highest confidence metrics and the contents of the frequency field of said record having the highest value in its frequency field; and c) determining whether said figure of merit is greater than a sixth pre-defined value and if so, selecting as said desired record said record having the highest value in its frequency field.

16. A method as claimed in claim 1 wherein said frequency field is further operable to store a frequency of success metric related to the number of times the related record is selected as the desired record.

17. An apparatus for locating a desired record amongst a plurality of records in a telephone directory, the apparatus comprising:

a) computer readable memory media operable to store said plurality of records, each of said records having a frequency field and a characteristic field, said frequency field being operable to store a frequency metric representing the frequency of use of said record, based on incoming and outgoing calls said characteristic field being operable to store a characteristic representation of at least one identifying characteristic of a rendering associated with said record;

b) a digitizer for producing an input representation of a rendering purporting to identify said desired record;

c) a processor; and d) instruction codes operable to direct said processor to:

i) compare said input representation with the contents of the characteristic fields of at least some of said records and to assign confidence metrics to said records respectively, each of said confidence metrics representing a respective probability that a respective record is the desired record;

ii) determine which of said records have the first and second highest confidence metrics; and iii) read the frequency fields of said records having the first and second highest confidence metrics and select said desired record from said records having the first and second highest confidence metrics, as a function of said first and second highest confidence metrics and the frequency metrics of said records having the first and second highest confidence metrics.

18. An apparatus as claimed in claim 17 further comprising instruction codes operable to direct said processor to increase the contents of the frequency field of the desired record.

19. An apparatus as claimed in claim 17 further comprising instruction codes operable to direct the processor to perform the step of determining whether at least one of said first and second highest confidence metrics have a value greater than a first pre-defined value.

20. An apparatus as claimed in claim 19 wherein said frequency field is further operable to store a frequency of success metric related to the number of times the related record is selected as the desired record.

21. An apparatus as claimed in claim 17 further comprising instruction codes operable to direct the processor to perform the step of where the user denies that the record having the second highest frequency metric is the desired record, prompting the user to repeat the rendering.

22. An apparatus as claimed in claim 21 further comprising instruction codes operable to direct the processor to perform the step of, where the user confirms that the record having the first highest frequency metric is the desired record, selecting as the desired record, the record associated with the first highest frequency metric.

23. An apparatus as claimed in claim 19 further comprising instruction codes operable to direct the processor to perform the step of when said first highest confidence metric is greater than said first pre-defined value, and said difference is less than a second pre-defined value, selecting as said desired record the record associated with the first highest frequency metric when said first highest frequency metric is greater than a third pre-defined value.

24. An apparatus as claimed in claim 23 further comprising instruction codes operable to direct the processor to perform the step of determining a difference between said first and second highest confidence metrics.

25. An apparatus as claimed in claim 24 further comprising instruction codes operable to direct the processor to perform the step of when said first highest confidence metric is greater than said first pre-defined value and said difference is greater than a second pre-defined value, select as said desired record the record associated with the first highest confidence metric.

26. An apparatus as claimed in claim 25 further comprising instruction codes operable to direct the processor to perform the step of when said first highest confidence metric is greater than said first pre-defined value, and said difference is less than a second predefined value, selecting as said desired record the record associated with the first highest frequency metric when said first highest frequency metric is greater than a third pre-defined value.

27. An apparatus as claimed in claim 21 further comprising instruction codes operable to direct the processor to perform the step of, where said first highest frequency metric is less than said third pre-defined value, prompting the user to repeat the rendering.

28. An apparatus as claimed in claim 27 further comprising instruction codes operable to direct the processor to perform the step of, when said first highest confidence metric is not greater than a fourth pre-defined value or said difference between said confidence metrics is not greater than a fifth pre-defined value, and when said difference in confidence metrics is less than said fifth pre-defined value, determining which of said records having the first and second highest confidence metrics has the first highest frequency metric and prompting the user to confirm that the record having the first highest frequency metric is the desired record.

29. An apparatus as claimed in claim 27 further comprising instruction codes operable to direct the processor to perform the steps of:

a) determining which of said records having the first and second highest confidence metrics has the highest value in its frequency field;

b) determining a figure of merit based on a weighted sum of the confidence metric associated with the record having the frequency field with the highest value, the difference between the first and second highest confidence metrics and the contents of the frequency field of said record having the highest value in its frequency field; and c) determining whether said figure of merit is greater than a sixth pre-defined value and if so, selecting as said desired record said record having the highest value in its frequency field.

30. An apparatus as claimed in claim 29 further comprising instruction codes operable to direct the processor to perform the step of, where the user denies that the record having the first highest frequency metric is the desired record, prompting the user to confirm that the record having the second highest frequency metric is the desired record.

31. An apparatus as claimed in claim 29 further comprising instruction codes operable to direct the processor to perform the step of receiving an oral utterance from said user.

32. An apparatus as claimed in claim 17 wherein said frequency field is further operable to store a frequency of success metric related to the number of times the related record is selected as the desired record.

33. A computer-readable storage medium operable to store codes operable to direct a computer to locate a desired record amongst a plurality of records in a telephone directory, by:

a) associating a frequency field with each of said records, said frequency field being operable to store a frequency metric representing the frequency of use of said record, based on incoming and outgoing calls;

b) associating a characteristic field with each of said records, said characteristic field being operable to store a characteristic representation of at least one identifying characteristic of a rendering associated with said record;

c) producing an input representation of a rendering purporting to identify said desired record;

d) comparing said input representation with the contents of the characteristic fields of at least some of said records and assigning confidence metrics to said records respectively, each of said confidence metrics representing a respective probability that a respective record is the desired record;

e) determining which of said records have the first and second highest confidence metrics; and f) selecting said desired record from said records having the first and second highest confidence metrics, as a function of said first and second highest confidence metrics and the frequency metrics of said records having the first and second highest confidence metrics.

34. A computer-readable storage medium as claimed in claim 33 further comprising codes operable to direct the computer to perform the step of increasing the contents of the frequency field of the desired record.

35. A computer-readable storage medium as claimed in claim 33 further comprising codes operable to direct the computer to perform the step of determining whether at least one of said first and second highest confidence metrics has a value greater than a first pre-defined value.

36. A computer-readable storage medium as claimed in claim 33 further comprising codes operable to direct the 37. A computer-readable storage medium as claimed in claim 33 further comprising codes operable to direct the computer to perform the step of when said first highest confidence metric is greater than said first pre-defined value and said difference is greater than a second pre-defined value, selecting as said desired record that record associated with the first highest confidence metric.

38. A computer-readable storage medium as claimed in claim 33 further comprising codes operable to direct the computer to perform the step of when said first highest confidence metric is greater than said first pre-defined value, and said difference is less than a second pre-defined value, selecting as said desired record the record associated with the first highest frequency metric when said first highest frequency metric is greater than a third pre-defined value.

39. A computer-readable storage medium as claimed in claim 38 further comprising codes operable to direct the computer to perform the step of, where said first highest frequency metric is less than said third pre-defined value, prompting the user to repeat the rendering.

40. A computer-readable storage medium as claimed in claim 39 further comprising codes operable to direct the computer to perform the step of digitizing an utterance made by the user.

41. A computer-readable storage medium as claimed in claim 40 further comprising codes operable to direct the computer to perform the step of receiving an oral utterance from said user.

42. A computer-readable storage medium as claimed in claim 38 further comprising codes operable to direct the computer to perform the step of, when said first highest confidence metric is not greater than a fourth pre-defined value or said difference between said confidence metrics is not greater than a fifth pre-defined value, and when said difference in confidence metrics is less than said fifth pre-defined value, determining which of said records having the first and second highest confidence metrics is associated with the first highest frequency metric and prompting the user to confirm that the record having the first highest frequency metric is the desired record.

43. A computer-readable storage medium as claimed in claim 42 further comprising codes operable to direct the computer to perform the step of, where the user confirms that the record having the first highest frequency metric is the desired record, selecting as the desired record, the record associated with the first highest frequency metric.

44. A computer-readable storage medium as claimed in claim 43 further comprising codes operable to direct the computer to perform the step of, where the user denies that the record having the first highest frequency metric is the desired record, prompting the user to confirm that the record having the second highest frequency metric is the desired record.

45. A computer-readable storage medium as claimed in claim 44 further comprising codes operable to direct the computer to perform the step of where the user confirms that the record having the second highest frequency metric is the desired record, selecting as the desired record, the record which has the second highest frequency metric and incrementing the contents of the frequency field of said desired record.

46. A computer-readable storage medium as claimed in claim 44 further comprising codes operable to direct the computer to perform the step of where the user denies that the record having the second highest frequency metric is the desired record, prompting the user to repeat the rendering.

47. A computer-readable storage medium as claimed in claim 33 further comprising codes operable to direct the computer to perform the steps of:
   a) determining which of said records having the first and second highest confidence metrics has the highest value in its frequency field;
   b) determining a figure of merit based on a weighted sum of the confidence metric associated with the record having the frequency field with the highest value, the difference between the first and second highest confidence metrics and the contents of the frequency field of said record having the highest value in its frequency field; and
   c) determining whether said figure of merit is greater than a sixth pre-defined value and if so, selecting as said desired record said record having the highest value in its frequency field.

48. A computer-readable storage medium as claimed in claim 33 wherein said frequency field is further operable to store a frequency of success metric related to the number of times the related record is selected as the desired record.

49. A method of locating a desired record amongst a plurality of records in a telephone directory, the method comprising:
   a) associating a frequency metric with each of said records, said frequency metric representing the incoming and outgoing calls;
   b) associating a characteristic representation with each of said records, said characteristic representation identifying a rendering;
   c) receiving an input representation of a rendering to identify said desired record;
   d) comparing said input representation with the characteristic representation for at least some of said records and assigning confidence metrics to said at least some of said records, each of said confidence metrics representing a probability that a respective record is the desired record; and
   e) selecting said desired record as a function of said confidence metrics and the frequency metrics.

* * * * *

UNITED STATES PATENT AND TRADEMARK OFFICE
CERTIFICATE OF CORRECTION

PATENT NO.   : 6,208,713 B1
DATED        : March 27, 2001
INVENTOR(S)  : Rahrer et al.

It is certified that error appears in the above-identified patent and that said Letters Patent is hereby corrected as shown below:

<u>Title page,</u>
Item [56], References Cited, U.S. PATENT DOCUMENTS, add the following:
-- 5,179,921   2/1998   Vysotsky et al. ........................... 379/88.01 --

<u>Column 19,</u>
Line 37, delete "including the step of".
Line 43, between "6" and "comprising", insert -- further --.

<u>Columns 21-22,</u>
Beginning at line 6, delete claims 20-32 as published and substitute the following claims therefor:

-- 20.  An apparatus as claimed in claim 17 further comprising instruction codes operable to direct the processor to perform the step of determining a difference between said first and second highest confidence metrics.

21.  An apparatus as claimed in claim 20 further comprising instruction codes operable to direct the processor to perform the step of when said first highest confidence metric is greater than said first pre-defined value and said difference is greater than a second pre-defined value, select as said desired record the record associated with the first highest confidence metric.

22.  An apparatus as claimed in claim 19 further comprising instruction codes operable to direct the processor to perform the step of when said first highest confidence metric is greater than said first pre-defined value, and said difference is less than a second predefined value, selecting as said desired record the record associated with the first highest frequency metric when said first highest frequency metric is greater than a third pre-defined value.

23.  An apparatus as claimed in claim 22 further comprising instruction codes operable to direct the processor to perform the step of, where said first highest frequency metric is less than said third pre-defined value, prompting the user to repeat the rendering.

24.  An apparatus as claimed in claim 23 further comprising instruction codes operable to direct the processor to perform the step of digitizing an utterance made by the user.

UNITED STATES PATENT AND TRADEMARK OFFICE
CERTIFICATE OF CORRECTION

PATENT NO. : 6,208,713 B1
DATED : March 27, 2001
INVENTOR(S) : Rahrer et al.

It is certified that error appears in the above-identified patent and that said Letters Patent is hereby corrected as shown below:

25. An apparatus as claimed in claim 24 further comprising instruction codes operable to direct the processor to perform the step of receiving an oral utterance from said user.

26. An apparatus as claimed in claim 20 further comprising instruction codes operable to direct the processor to perform the step of, when said first highest confidence metric is not greater than a fourth pre-defined value or said difference between said confidence metrics is not greater than a fifth pre-defined value, and when said difference in confidence metrics is less than said fifth pre-defined value, determining which of said records having the first and second highest confidence metrics has the first highest frequency metric and prompting the user to confirm that the record having the first highest frequency metric is the desired record.

27. An apparatus as claimed in claim 26 further comprising instruction codes operable to direct the processor to perform the step of, where the user confirms that the record having the first highest frequency metric is the desired record, selecting as the desired record, the record associated with the first highest frequency metric.

28. An apparatus as claimed in claim 26 further comprising instruction codes operable to direct the processor to perform the step of, where the user denies that the record having the first highest frequency metric is the desired record, prompting the user to confirm that the record having the second highest frequency metric is the desired record.

29. An apparatus as claimed in claim 28 further comprising instruction codes operable to direct the processor to perform the step of where the user confirms that the recording having the second highest frequency metric is the desired record, selecting as the desired record, the record which has the second highest frequency metric.

30. An apparatus as claimed in claim 28 further comprising instruction codes operable to direct the processor to perform the step of where the user denies that the record having the second highest frequency metric is the desired record, prompting the user to repeat the rendering.

UNITED STATES PATENT AND TRADEMARK OFFICE
CERTIFICATE OF CORRECTION

PATENT NO. : 6,208,713 B1
DATED : March 27, 2001
INVENTOR(S) : Rahrer et al.

It is certified that error appears in the above-identified patent and that said Letters Patent is hereby corrected as shown below:

31. An apparatus as claimed in claim 17 further comprising instruction codes operable to direct the processor to perform the steps of:

a) determining which of said records having the first and second highest confidence metrics has the highest value in its frequency field;

b) determining a figure of merit based on a weighted sum of the confidence metric associated with the record having the frequency field with the highest value, the difference between the first and second highest confidence metrics and the contents of the frequency field of said record having the highest value in its frequency field; and c) determining whether said figure of merit is greater than a sixth pre-defined value and if so, selecting as said desired record said record having the highest value in its frequency field.

32. An apparatus as claimed in claim 19 wherein said frequency field is further operable to store a frequency of success metric related to the number of times the related record is selected as the desired record. --

Column 24,
Line 39, subparagraph a), between "representing the" and "incom-", insert -- frequency of use of said record based on --.

Signed and Sealed this

Second Day of July, 2002

*Attest:*

JAMES E. ROGAN
*Attesting Officer*        *Director of the United States Patent and Trademark Office*